US012250896B2

(12) United States Patent
Hale et al.

(10) Patent No.: US 12,250,896 B2
(45) Date of Patent: Mar. 18, 2025

(54) SYSTEMS AND METHODS FOR PLANTING FLORA AND FAUNA THROUGH DRONE DELIVERY

(71) Applicant: Blue Ocean Quest 2, LLC, Jacksonville, FL (US)

(72) Inventors: Ernest Hale, St. Augustine, FL (US); Gary Silverfield, Jacksonville Beach, FL (US)

(*) Notice: Subject to any disclaimer, the term of this patent is extended or adjusted under 35 U.S.C. 154(b) by 175 days.

(21) Appl. No.: 17/501,021

(22) Filed: Oct. 14, 2021

(65) Prior Publication Data

US 2022/0117150 A1 Apr. 21, 2022

Related U.S. Application Data

(60) Provisional application No. 63/220,922, filed on Jul. 12, 2021, provisional application No. 63/092,402, filed on Oct. 15, 2020.

(51) Int. Cl.
*A01C 11/02* (2006.01)
*A01G 9/029* (2018.01)
(Continued)

(52) U.S. Cl.
CPC ............ *A01C 11/02* (2013.01); *A01G 9/0291* (2018.02); *A01G 9/0299* (2018.02); *B64D 1/02* (2013.01);
(Continued)

(58) Field of Classification Search
CPC .... A01G 9/0299; A01G 9/0291; A01C 11/02; A01C 7/18; A01C 7/10; A01C 7/085;
(Continued)

(56) References Cited

U.S. PATENT DOCUMENTS 3,476,337 A * 11/1969 Cornett, Jr. ............ B64D 1/18
239/171
4,347,951 A * 9/1982 Wood ..................... A01C 11/00
221/258

(Continued)

FOREIGN PATENT DOCUMENTS

| CN | 108569402 A | * | 9/2018 | ............ A01C 1/00 |
| CN | 111284698 A | * | 6/2020 | |
| CN | 113711735 A | * | 11/2021 | |

OTHER PUBLICATIONS

English translation of CN-111284698 (attached) (Year: 2020).*
KR 20120052480 to Kang and English translation are together attached (Year: 2012).*

*Primary Examiner* — Peter M Poon
*Assistant Examiner* — Marisa V Conlon
(74) *Attorney, Agent, or Firm* — Wilson Dutra, PLLC; Camille A. Wilson

(57) ABSTRACT

The present disclosure provides generally for a system and method for planting flora, fauna, and dispersing various organisms through drone delivery. The system may comprise of a drone with seedling box that may hold and drop the pods containing flora or fauna. The seedling box may hold the pods with the flora or fauna in them and at specific intervals drop the pod with the flora or fauna. The seedling box may also hold various organisms or other materials and drop these organisms or materials when directed. A seedling box may comprise loading mechanism and deploying mechanism to facilitate accurate, timely deployment of the pods containing the seedlings. A pod may comprise a weighted tip with hollow cavity for seedling placement and a vertical rod for securing seedling during deployment. Where the system comprises uneven number of seedlings, seedling box may include counterweights to provide stabil- (Continued)

ity in configured flight patterns for duration of seedling deployment.

4 Claims, 37 Drawing Sheets

(51) Int. Cl.
*B64D 1/02* (2006.01)
*B64U 101/40* (2023.01)
*A01C 11/00* (2006.01)
*B64U 101/30* (2023.01)
*B64U 101/64* (2023.01)

(52) U.S. Cl.
CPC ........ *A01C 11/003* (2013.01); *B64U 2101/40* (2023.01); *B64U 2101/64* (2023.01)

(58) Field of Classification Search
CPC ........... A01C 7/16; A01C 7/163; A01C 7/166; B64D 1/02
See application file for complete search history.

(56) References Cited

U.S. PATENT DOCUMENTS

| | | | | |
|---|---|---|---|---|
| 5,524,559 A | * | 6/1996 | Davidson | A01C 7/081 |
| | | | | 221/277 |
| 9,382,003 B2 | * | 7/2016 | Burema | A01C 21/00 |
| 10,814,980 B2 | * | 10/2020 | Zvara | A01G 9/0293 |

* cited by examiner

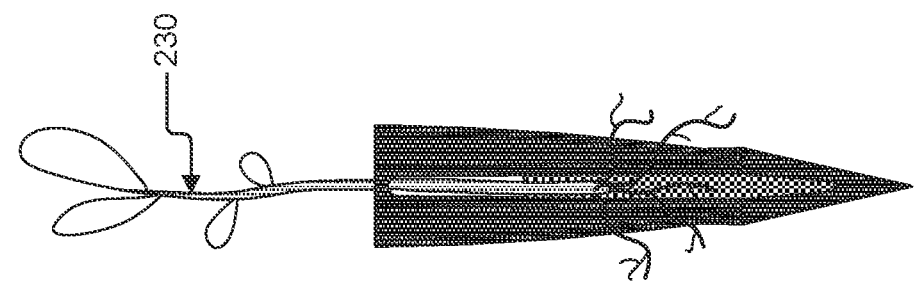
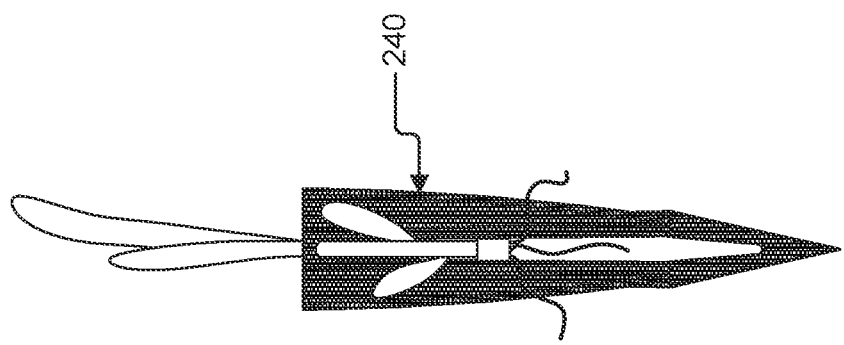
FIG. 2

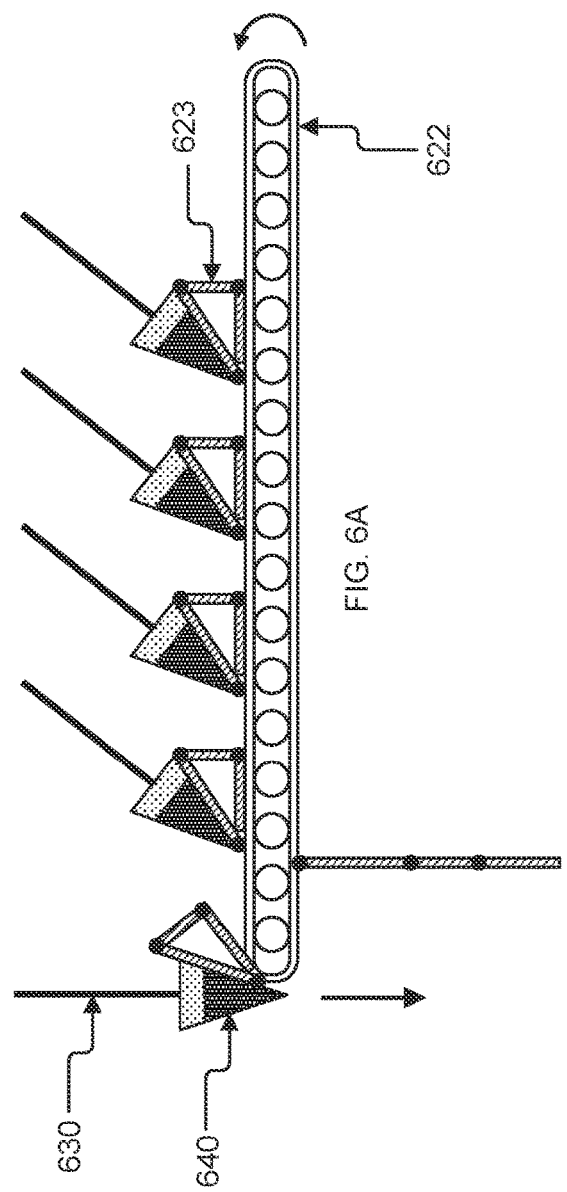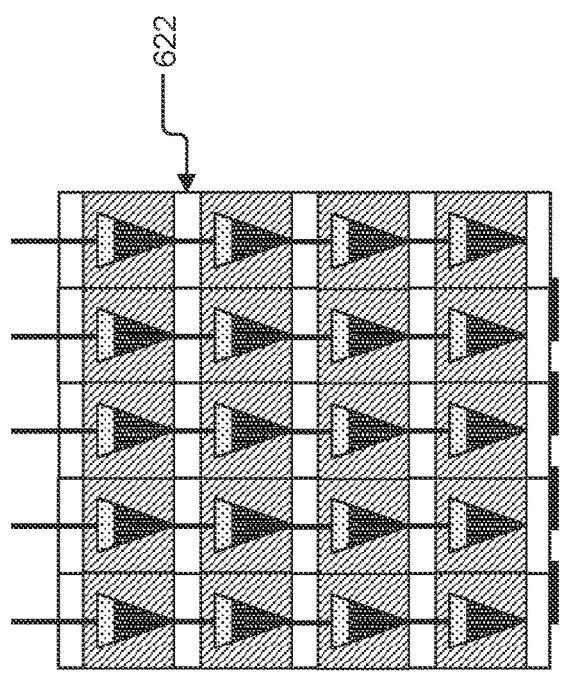

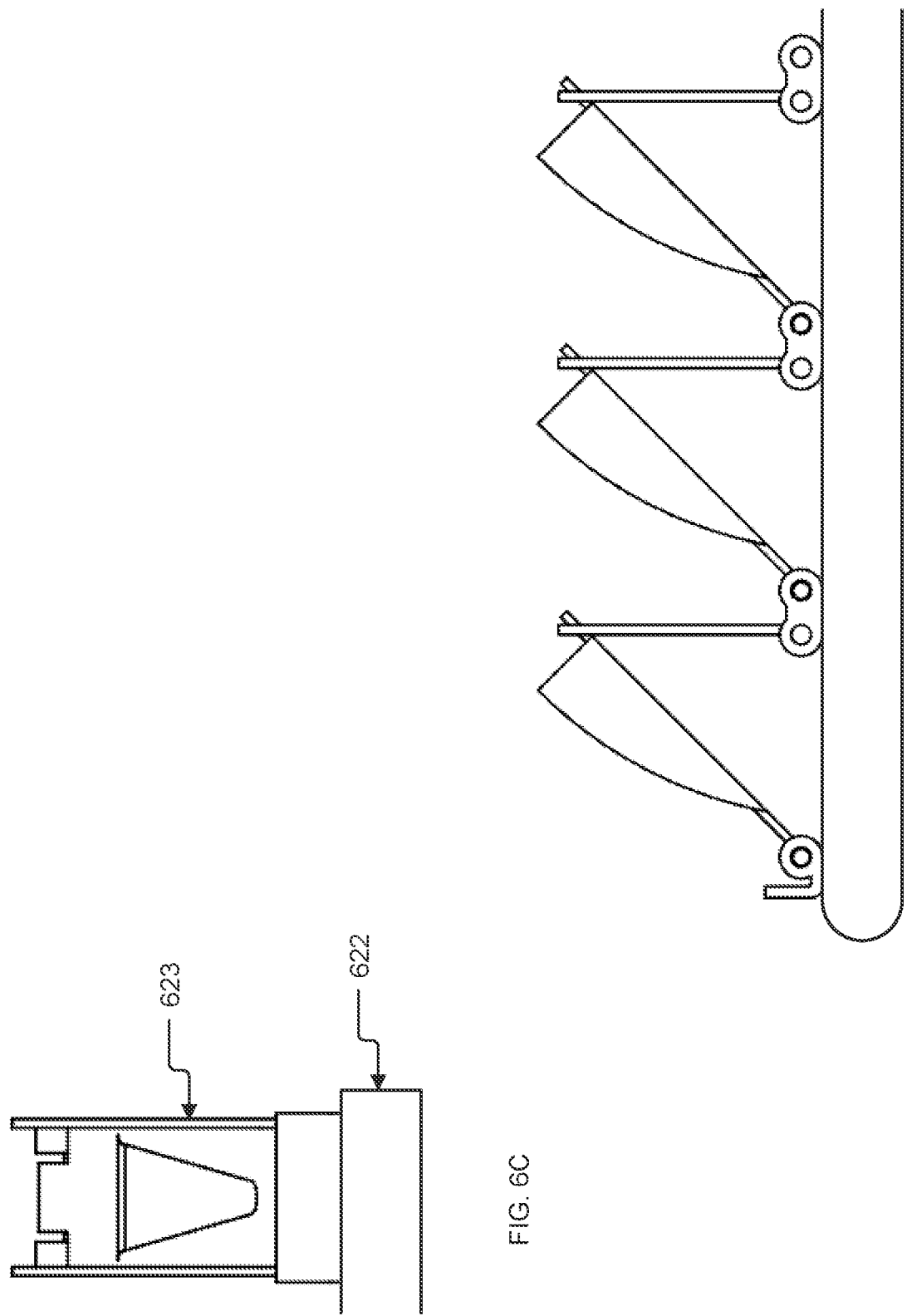

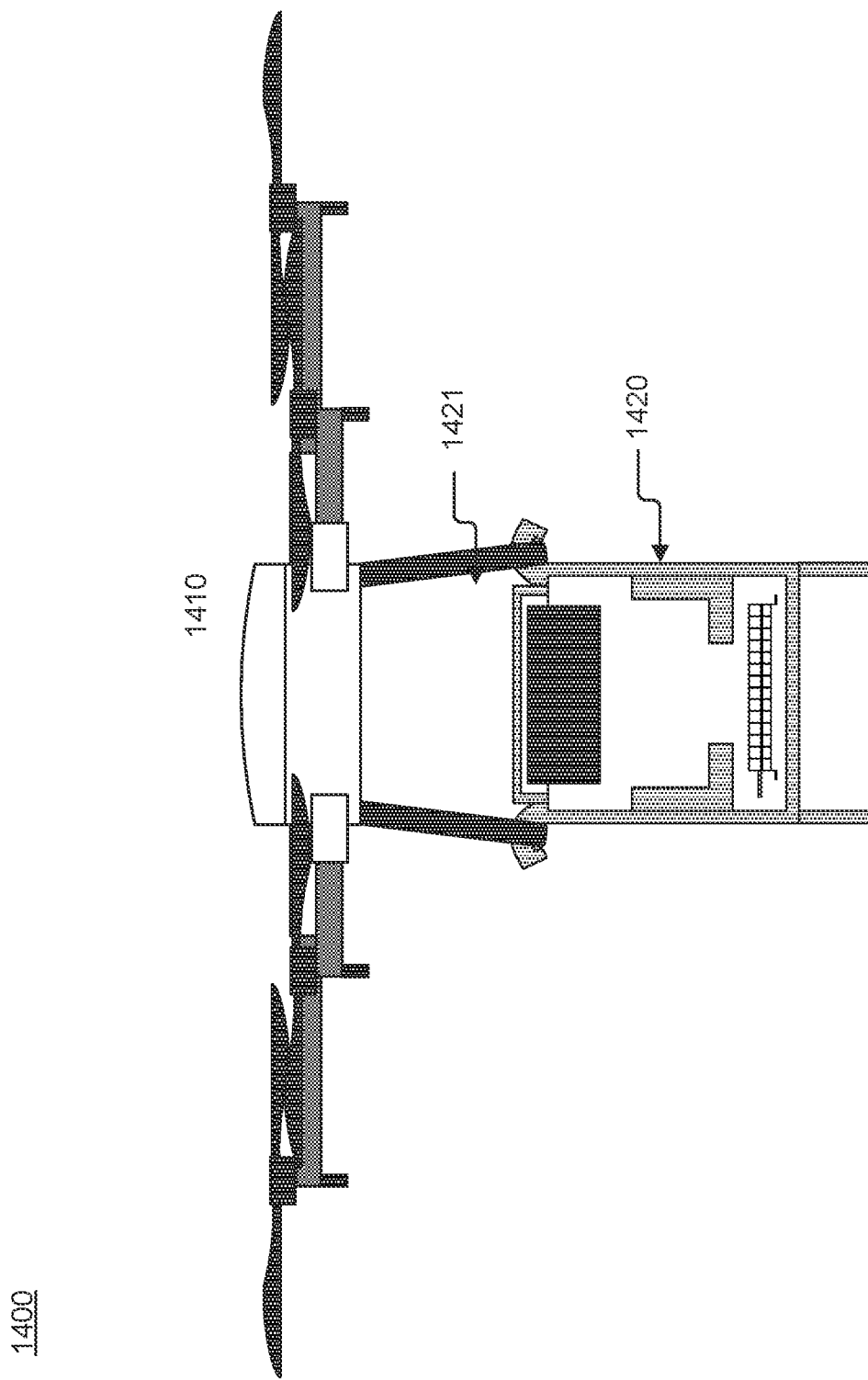

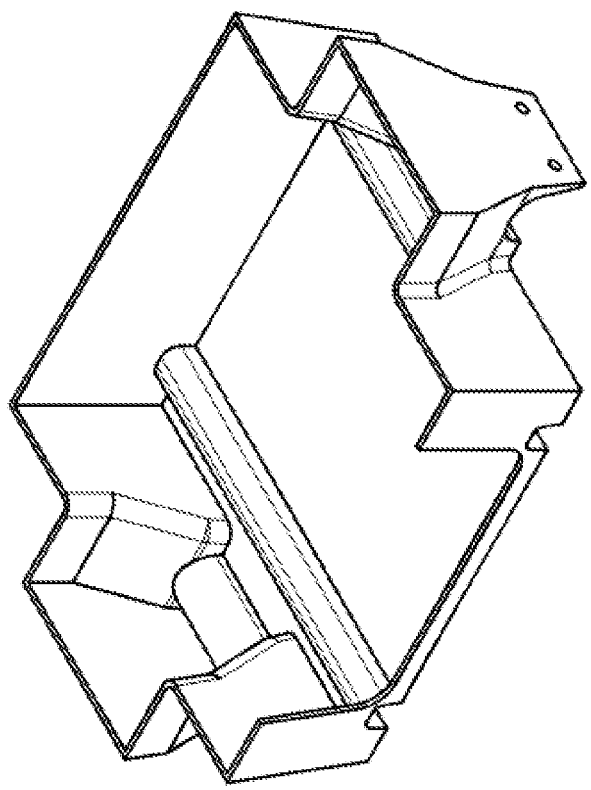
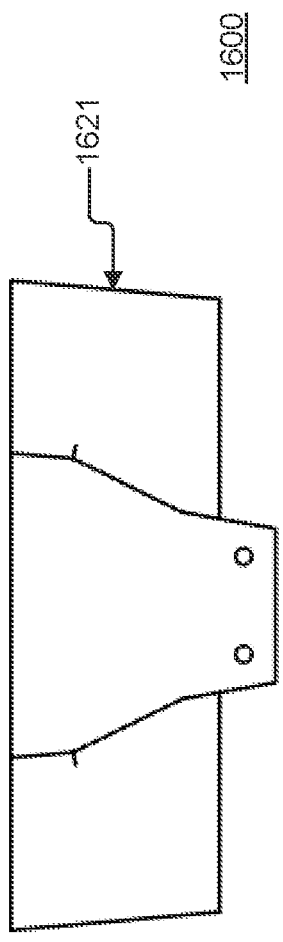

1822

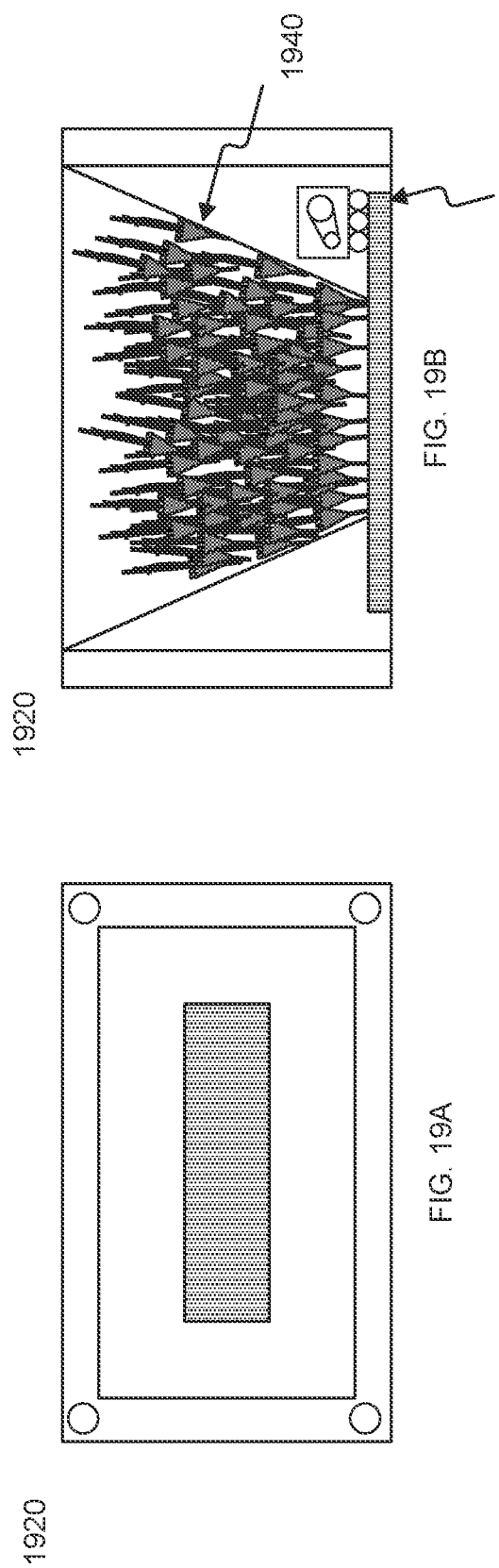

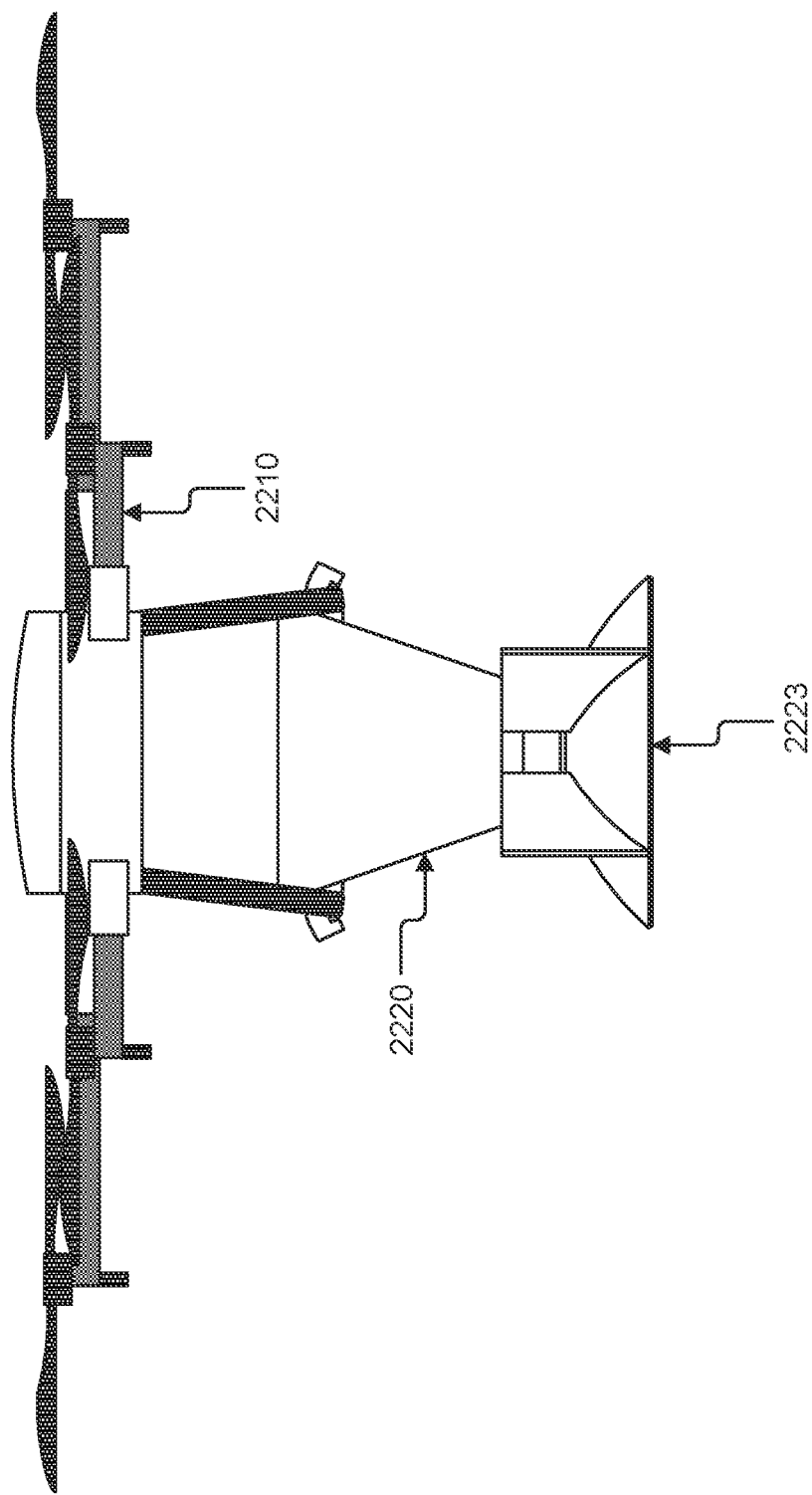

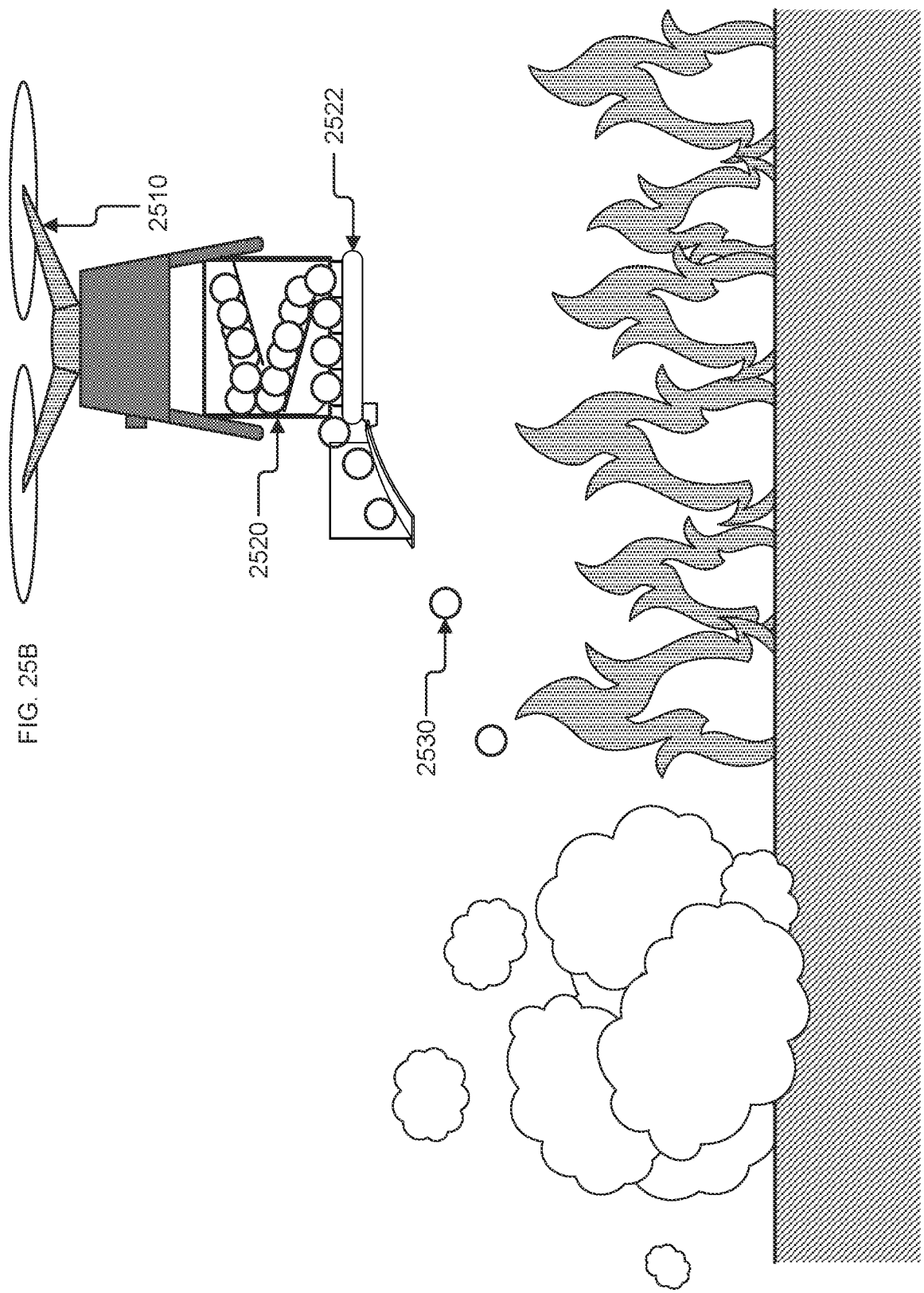

SYSTEMS AND METHODS FOR PLANTING FLORA AND FAUNA THROUGH DRONE DELIVERY

CROSS-REFERENCE TO RELATED APPLICATION

This application claims priority to and the full benefit of U.S. Provisional Patent Application Ser. No. 63/092,402, filed Oct. 15, 2020, and titled "SYSTEMS AND METHODS FOR PLANTING FLORA THROUGH DRONE DELIVERY", and U.S. Provisional Patent Application Ser. No. 63/220,922, filed Jul. 12, 2021, and titled "SYSTEMS AND METHODS FOR PLANTING FLORA THROUGH DRONE DELIVERY", the entire contents of which are incorporated in this application by reference.

BACKGROUND

On average, Americans spend $650 million per year attempting to address damage caused by coastal erosion. Erosion occurs as natural factors, such as strong waves, wind, and flooding, eat away at land, including coastlines. Although erosion is a naturally occurring process, it may be exacerbated by storm surges, temperature changes, human interference, precipitation increases, or the rise in sea level. Due to the rising sea and erosion, around nine acres of coastal wetlands are lost each day in the United States. While some southeastern islands may see as much as a 25-foot recession of coastline per year, densely populated areas that see a change in only one or two feet may face catastrophic effects.

Many coastal communities, environmental non-profit organizations, and other governmental entities have tried a number of solutions to combat coastal erosion, but each comes with other negative effects. Shoreline hardening occurs when communities build structures, such as seawalls or levees, along the shore to prevent erosion. This type of prevention, however, is costly, may disturb ocean currents, and diverts the harsh erosion-inducing conditions onto neighboring properties, worsening the effects in those areas. Some communities may choose to use beach nourishment to combat erosion by replenishing the eroded sand. This process is also costly and there is no guarantee that the sand will stay in place.

Native plants, such as mangroves, seagrass, spartina grass, eel grass and other aquatic vegetation, may act as a natural solution to combat coastal erosion. These plants are adapted to the harsh conditions they may endure, such as drastically high or low amounts of moisture due to tides and seasons, high temperatures, and unpredictable weather patterns. While the vegetations' root systems help in securing the sand during these conditions, flooding or storm surges may still affect the plants by lifting them out of the ground completely. Once these plants are removed, some communities attempt to re-plant the same or similar vegetation to recreate the same effect. Unfortunately, this sometimes may do more harm than good. In most situations, it is difficult to force reproduction of these plants. Additionally, walking on the sand or soil to manually plant each seed risks further damage to the ecosystem.

Unique from other plants, some native coastal plants reproduce more closely to mammals. While most plants produce dormant seeds that may or may not be planted at a later time to bring the plant to life, mangroves, produce the seed, germinate, and grow the plant while still attached. The parent mangrove plant grows the new mangrove while still attached until it is so heavy that it falls off. At this stage, the child plant, which has already begun growing, drops and secures itself into the wet coastal soil, so that it may grow and flourish.

Other aquatic organisms, such as oysters and clams, can also aid in preventing shoreline erosion. Oyster reefs are productive components of estuary and other aquatic ecosystems, constructing barriers against inclement weather, tides, and coastal erosion. Both oysters and clams may also filter surrounding water, thereby cleansing their localized environment. Oysters are protandric and have a unique life cycle. A single oyster can spawn both egg and sperm when ocean temperatures warm up to about 68 degrees Fahrenheit, which takes place at different times of the year depending on location.

Early in their lifecycle, oysters are referred to as spat. Spat are extremely small, and latch onto hard objects, such as mature oysters, to settle in and grow. Extremely concentrated at this stage, a few thousand spats can fit in a water bottle cap. This might make for a later uneven distribution of an oyster reef along a coastline, resulting in similar problems in dealing with coastal erosion as mentioned above.

SUMMARY OF THE DISCLOSURE

What is needed is a system to better distribute erosion-preventing organisms and recreate the planting of seeds into the soil to promote regrowth of destroyed coastal vegetation without further interfering with the ecosystem. More specifically, what is needed is a method for deploying flora, fauna, and other aquatic organisms that reduce the required time and labor and enables the planting of areas that may be harmed or physically inaccessible by people. The present disclosure provides generally for a system and method for planting flora and dispersing other aquatic organisms through drone delivery. For example, the aquatic organisms may comprise oysters.

The system may comprise a drone seedling box that may hold and drop the pods that will hold the flora or fauna. In some embodiments, the seedling box may hold the pods with the flora or fauna in them and at specific intervals drop the pod with the flora or fauna. In some implementations, a seedling box may comprise a loading mechanism and deploying mechanism to facilitate accurate, timely deployment of the pods containing the seedlings. In some aspects, a pod may comprise a weighted tip with hollow cavity for seedling placement and vertical rod for securing seedling during deployment. Where the system comprises an uneven number of seedlings, a seedling box may include counterweights to provide stability in configured flight patterns for duration of seedling deployment.

In some embodiments, the system may consist of a drone with seedling box that may hold and drop the pods that will hold the seedlings. In some implementations, the seedling box may hold the pods with the seedlings and, at specific intervals, may deploy the pod containing the seedling. In some aspects, the pod may descend to the sea or riverbed and come to rest in a position that may allow the plant to have its roots under the sea or riverbed so it can survive.

In some embodiments, an automated system of planting flora and fauna and other organisms, particularly aquatic flora, such as mangroves, Spartina grass, and sea grass, and other aquatic organisms, such as oysters, may be implemented. In some implementations, drone delivery of pods with flora or fauna may allow for quick and accurate planting. In some aspects, automated delivery may replace manual dispersal and may supplement natural growth, which may be necessary to combat erosion. In some embodiments, an oyster seeder may be used to distribute oysters. For example, an auger method may be used with a vessel model to give velocity as a delivery vessel is released from a drone.

In some embodiments, the method may utilize an aerial planting application via drone. In some implementations, the drone may carry the seedling box that may drop the pods on a predetermined grid and spacing. In some aspects, the pod may hold the seedling and carries it down to the sea or river floor. In some embodiments, the process may allow the plant to become embedded upright in the sea or river floor. In some implementations, this may enable the roots of the plant to become embedded in the soil and the roots are exposed, allowing it to grow. In some aspects, utilizing a drone may allow aquatic vegetation to be planted in a reduced amount of time than manual or natural planting.

In some embodiments, the present disclosure relates to a seedling box for drone delivery of seedlings. In some implementations, the seedling box includes a first container portion configured to house seedlings; a loading mechanism configured to move seedlings from the first container portion, and a deploying mechanism configured to receive seedlings from the loading mechanism and configured to deploy seedlings for planting.

In some aspects, the loading mechanism may comprise a series of angled planes configured to direct seedlings to the deploying mechanism. In some embodiments, the deploying mechanism may comprise an angled platform with at least one separator configured to separate seedlings upon deployment. In some implementations, the first container portion may comprise a drone connector mechanism configured to attach to a drone for delivery of seedlings.

In some aspects, the loading mechanism may be detachable. In some embodiments, the loading mechanism may be loadable with seedlings. In some implementations, the seedling box may comprise a second container portion configured to house seedlings. In some aspects, the deploying mechanism may comprise portioned ridges configured to rotate seedlings out of the first and second container portion. In some embodiments, the seedling box may comprise a secondary deploying mechanism configured to distribute seedlings received from the deploying mechanism. In some implementations, the secondary deploying mechanism may rotate. In some aspects, the seedlings may comprise flora. In some embodiments, the seedlings may comprise fauna.

The present disclosure relates to a drone with seedling box for drone delivery of seedlings. In some embodiments, the drone may include a drone; a first container portion configured to house seedlings, a drone connector mechanism configured to connect the first container portion to the drone, a loading mechanism configured to move seedlings from the first container portion, and a deploying mechanism configured to receive seedlings from the loading mechanism and configured to deploy seedlings for planting.

In some implementations, the seedling box may be detachable. In some aspects, the loading mechanism may comprise a series of angled planes configured to direct seedlings to the deploying mechanism. In some embodiments, the deploying mechanism may comprise an angled platform with at least one separator configured to separate seedlings upon deployment. In some implementations, the seedling box may comprise a second container portion configured to house seedlings. In some aspects, the deploying mechanism may comprise portioned ridges configured to rotate seedlings out of the first and second container portion. In some embodiments, the seedling box may comprise a secondary deploying mechanism configured to distribute seedlings received from the deploying mechanism. In some implementations, the secondary deploying mechanism may rotate.

BRIEF DESCRIPTION OF THE DRAWINGS

The accompanying drawings that are incorporated in and constitute a part of this specification illustrate several embodiments of the disclosure and, together with the description, serve to explain the principles of the disclosure:

FIG. 2 illustrates an exemplary pod containing a seedling, according to some embodiments of the present disclosure.

FIG. 6A illustrates exemplary deploying mechanism with a number of loading mechanisms, pods, seedlings, according to some embodiments of the present disclosure.

FIG. 6B illustrates exemplary deploying mechanism implementation with a number of loading mechanisms, pods, seedlings, according to some embodiments of the present disclosure.

FIG. 6C illustrates an exemplary loading mechanism, according to some embodiments of the present disclosure.

FIG. 6D illustrates exemplary loading mechanisms, according to some embodiments of the present disclosure.

FIG. 14 illustrates exemplary drone, according to some embodiments of the present disclosure.

FIG. 16A illustrates exemplary attachment container, according to some embodiments of the present disclosure.

FIG. 16B illustrates exemplary attachment container, according to some embodiments of the present disclosure.

FIG. 19A illustrates an exemplary seedling box, according to some embodiments of the present disclosure.

FIG. 19B illustrates an exemplary seedling box, according to some embodiments of the present disclosure.

FIG. 19C illustrates an exemplary seedling box, according to some embodiments of the present disclosure.

FIG. 22D illustrates an exemplary drone comprising a seedling box, according to some embodiments of the present disclosure.

FIG. 25B illustrates an exemplary seedling box delivering seedlings, according to some embodiments of the present disclosure.

DETAILED DESCRIPTION

The present disclosure provides generally for an automated system of planting flora and fauna and other organisms, particularly aquatic flora, such as mangroves, Spartina grass, and sea grass, and other aquatic organisms, such as oysters. According to the present disclosure, drone delivery of pods with flora or fauna may allow for quick and accurate planting. Automated delivery may replace manual dispersal and may supplement natural growth, which may be necessary to combat erosion.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Seedling box: as used herein refers to a receptacle which contains pods filled with seedlings for deployment when planting.

Pod: as used herein refers to receptacle which contains the seedling and is utilized to assist the seedling in penetrating the ground sufficient for seedling growth.

Seedling: as used herein refers to the deployable object released from the seedling box. The seedling may comprise organic or inorganic material. In some embodiments, the seedling may be deployed from the seedling box with one or more components, such as a pod. In some implementations, the seedling may comprise objects that do not grow. In some embodiments, the seedling may interact with its environment after deployment. In some aspects, the seedling may originate from different biological kingdoms such as, but not limited to, the animal kingdom and the plant kingdom. For ease of reference, seedlings are primarily described as aquatic, but should not be limited as such. For example, seedlings may comprise young hardwood trees, as a non-limiting example.

Figure 1A:
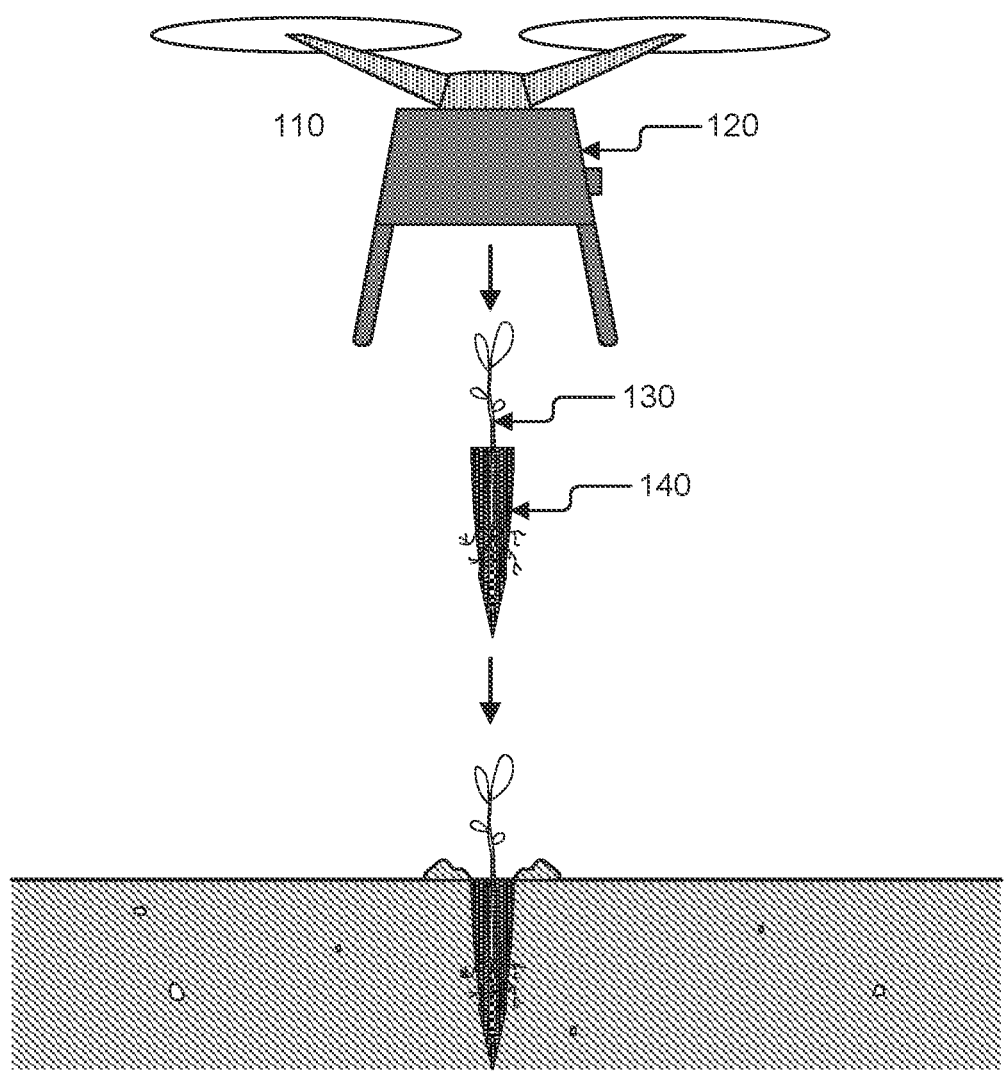
FIG. 1A illustrates exemplary embodiment of system for planting flora through drone delivery, according to some embodiments of the present disclosure.
Figure 1B:
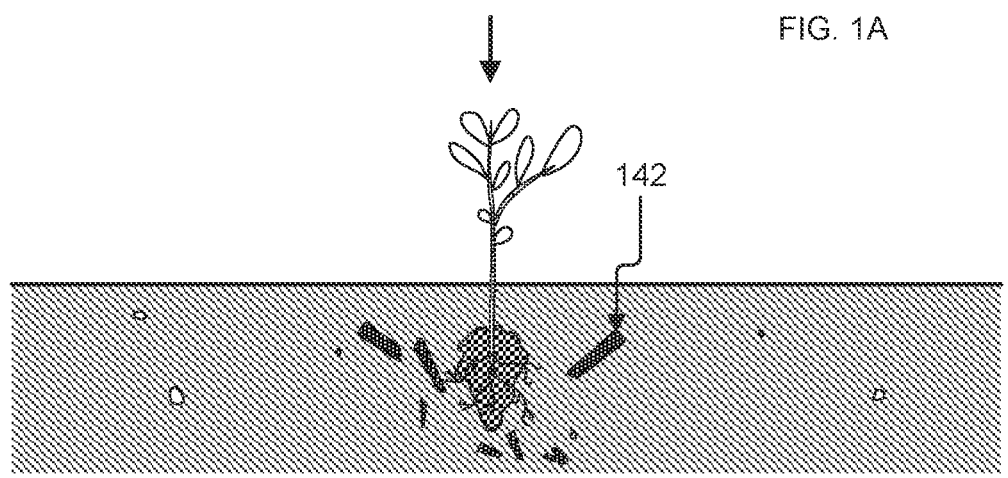
FIG. 1B illustrates exemplary pod fragments after seedling is integrated with the ground, according to some embodiments of the present disclosure.

Referring now to FIGS. 1A-1B, an exemplary embodiment of a system for planting flora through drone 110 delivery is illustrated. In some embodiments, the drone 110 may carry a seedling box 120 to deploy pods 140 containing seedlings 130. In some embodiments, after the seedling 130 is planted, the fertilizer within the pod 140 may enable the seedling 130 to grow. In some implementations, the pod 140 may comprise a variety of materials.

In some aspects, when the seedling 130 is planted, the pod 140 may begin to decompose. As the roots grow and the pod 140 decomposes, the structural integrity of the pod 140 may be reduced to pod fragments 142 that may continue to decompose. For example, the pod 140 may be formed from clay or biodegradable plastic that easily breaks into pod fragments 142, as non-limiting examples. For example, the clay may decompose into the soil as the roots of the seedling 130 apply larger amounts of force from the interior of the pod 140. In another example, the pod 140 may be constructed from a biodegradable plastic that contains slits or holes for the roots to begin growing into the surrounding ground before breaking the pod 140 into pod fragments 142.

Referring now to FIG. 2, an exemplary pod 240 containing a seedling 230 is illustrated. In some embodiments, the pod 240 may contain material that may help the seedling 230 to grow once the pod 240 is secured within the ground. For example, the pod 240 may contain a nutrient-rich soil that provides the necessary environment for growth within the seedling 230.

In another example, the pod 240 may contain a small segmented portion that contains a nutrient-rich liquid. Upon contact with the ground, the force may rupture the seal of the liquid and releases it into the pod 240 to stimulate rapid growth. In some aspects, this segmented portion may eject nutrient-rich liquid into the surrounding environment when the climate may be known as less supportive to stimulating seedling 230 growth. For example, the segmented portion containing nutrient-rich liquid may possess a semi-permeable membrane that releases the nutrients into the soil at a rate proportional to the moisture within the soil. This distribution method ensures that the nutrients are released when enough moisture exists in the soil for the seedling 230 to efficiently absorb the nutrients.

Figure 3A:
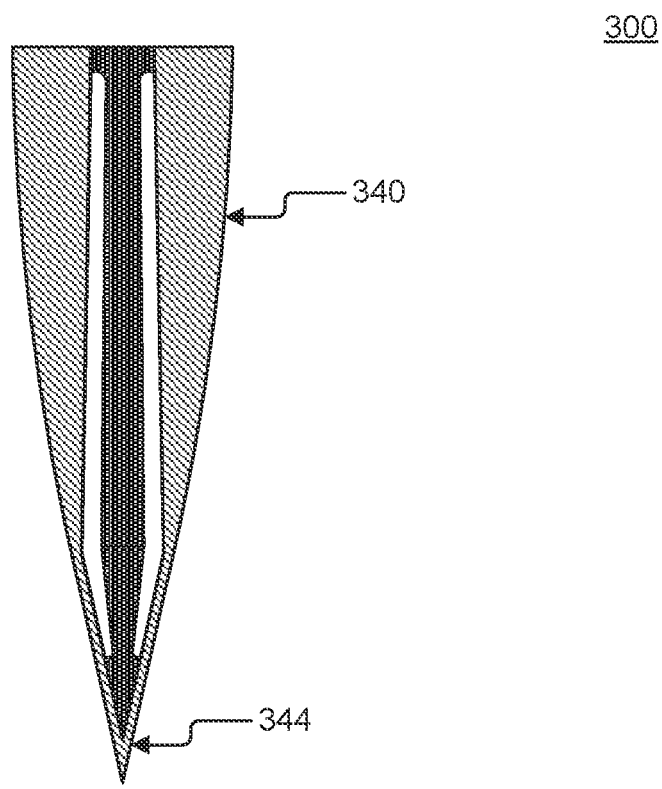
FIG. 3A illustrates an exemplary pod, according to some embodiments of the present disclosure.
Figure 3B:
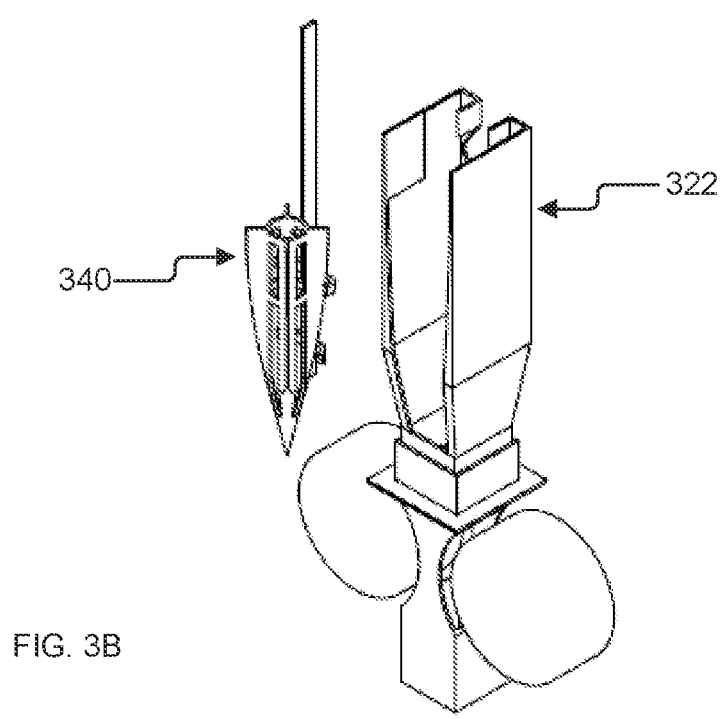
FIG. 3B illustrates an exemplary pod and deployment mechanism, according to some embodiments of the present disclosure.

Referring now to FIGS. 3A-B, an exemplary pod 340 and deployment mechanism 322 are illustrated. In some aspects, the deployment mechanism 322 may accept and grasp a pod 340 with seedling (not shown) to effectively shift and drop the pod 340 onto the targeted area. In some implementations, the pod 340 may comprise a support system that may provide additional rigidity and sturdiness to the seedling.

In some embodiments, the pod 340 may contain a weighted pod tip 344. The pod tip 344 may help to orient the seedling 330 and pod 340 vertically during deployment. In some implementations, the weighted pod tip 344 may possess the correct amount of weight to mimic the natural planting process of the seedling 330.

For example, a pod 340 may require a weighted tip 344 to produce the necessary force required to insert the pod 340 and seedling 330 into a more resistant surface. In another example, when a mangrove seedling detaches from the tree, the base of the seedling 330 is sufficiently weighted to allow the seedling 330 to sink beneath the surface of the water and remain vertically in contact with the submerged ground while the roots begin to secure the seedling 330 in the desired vertical position. Immediate planting may be preferable when deploying pods 340 in very little water or low tide.

In some embodiments, the planting process may endeavor to closely mimic the process found in nature. For example, a seed may drift on a stream before eventually sinking and planting itself in the submerged soil. To mimic this same process, the weighted tip may also include a sponge that may gradually increase in weight. The longer the pod is in the water, the sponge may accumulate water sufficient to sink and plant the seedling 330. In some aspects, the pod 340 may possess slots or openings to encourage the roots of the seedling 330 to grow into the surrounding soil. A floating process may be preferable when deploying pods 340 in shallow or deeper water.

In some embodiments, the pod 340 may possess various contours to improve aerodynamics and reduce air resistance. This may be useful if the seedling 330 requires planting in a surface that requires a larger penetration force. In some aspects, the contours of the pod 340 may vary based upon application.

For example, the pod 340 may be utilized to pass through multiple mediums in a desired trajectory. The pod 340 may be deployed and fall through the air and enter an additional medium such as water. Based upon the planting requirements of the seedling 330, the pod 340 may need to plant firm in the submerged ground or it may need to loosely drift as part of the planting process. These trajectories may utilize different forms of movement within the medium of the deployment which may be affected by the contours and shape of the pod 330.

Figure 4A:
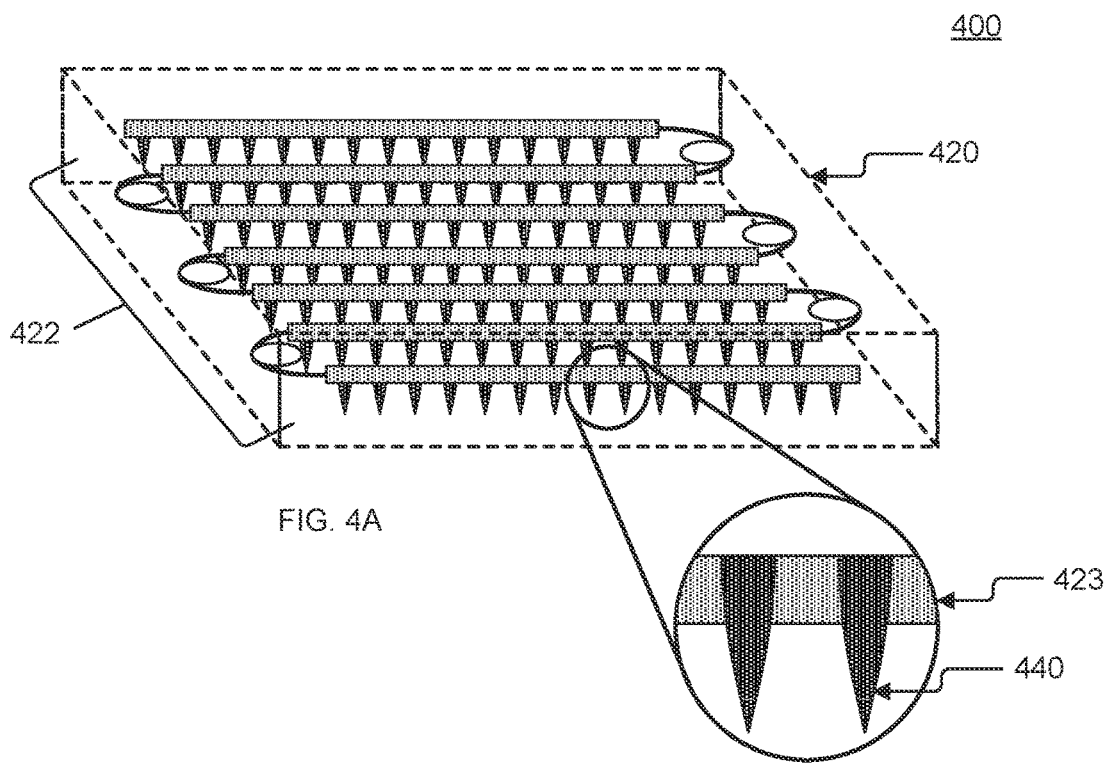
FIG. 4A illustrates exemplary seedling box comprising deploying mechanism, attachment mechanism, pod, according to some embodiments of the present disclosure.
Figure 4B:
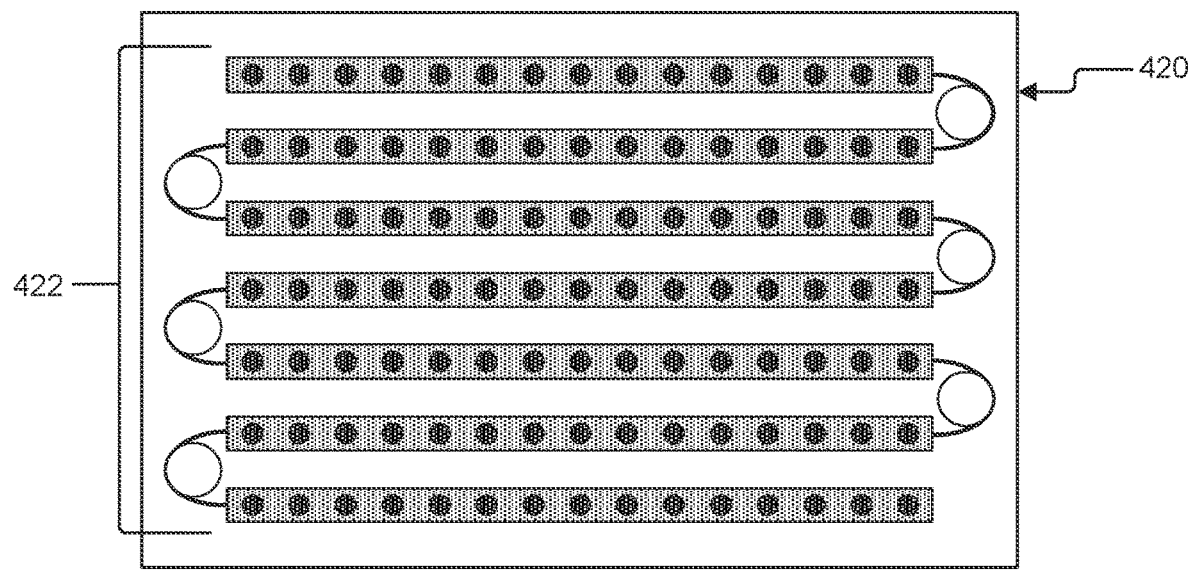
FIG. 4B illustrates exemplary seedling box comprising deploying mechanism, attachment mechanism, pod, according to some embodiments of the present disclosure.

Referring now to FIGS. 4A-4B, an exemplary seedling box 420 is illustrated. In some embodiments, the deploying mechanism 422 may be oriented in a layered format to increase the number of pods stored within the seedling box 420. In some implementations, the loading mechanism 423 may suspend the pod 440 in a vertical orientation.

In some aspects, the deploying mechanism 422 may deploy pods 440 at a predetermined constant rate. To maintain a constant rate of deployment, the deploying mechanism 422 may rotate at a variable rate within the drone 410. For example, the deploying mechanism 422 may increase in speed when the pod 440 travels around a corner in the deploying mechanism 422 structure to compensate for the greater distance traveled in a curve compared to a straight line.

In some embodiments, the deploying mechanism 422 may secure the pod by enclosing a portion of the pod 440 in a grip. In some implementations, the pod 440 may be released via lessened applied force that allows the pod 440 to fall free from the deploying mechanism 422. For example, each loading mechanism 423 may contain a low-energy signal emitter that communicates with a separate signal receiver at the point of deployment. This signal correspondence may allow the loading mechanism 423 to release the pod 440 and may monitor how many pods 440 are remaining.

In another example, placing the pod 440 within the loading mechanism 423 may include an application of force that may allow the pod 440 to mechanically snap into place.

As the mechanism secures the pod 440, a lever may shift that is exposed at the top of the loading mechanism 423. When a pod 440 is deployed, the loading mechanism 423 may release the pod 440 as the lever is physically shifted into a release position. This may occur via an extruded structure positioned above the deployment location within the drone 410.

Figure 5:
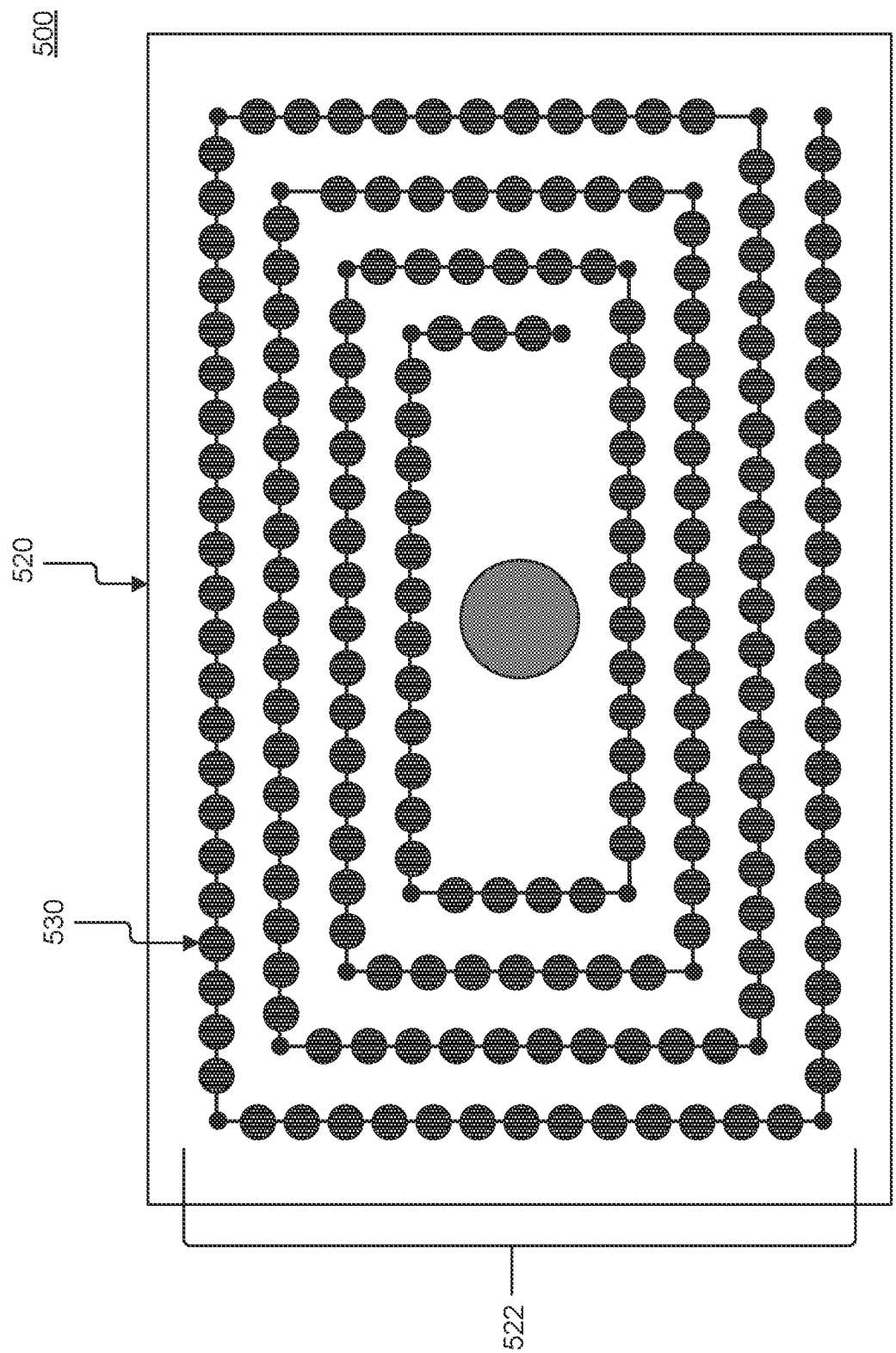
FIG. 5 illustrates exemplary configuration of seedlings within a seedling box, according to some embodiments of the present disclosure.

Referring now to FIG. 5, an exemplary configuration of seedlings 530 within a seedling box 520 is illustrated. In some embodiments, the deploying mechanism 522 may be oriented in a nested format to increase the number of pods 540 stored within the seedling box 520. In some implementations, the seedling 530 may be suspended in a vertical orientation. In some aspects, the deploying mechanism 522 could deploy pods 540 at a predetermined constant rate.

To maintain a constant rate of deployment, the deploying mechanism 522 may rotate at a variable rate within a drone. For example, the deploying mechanism 522 may increase in speed when the pod 540 travels around a corner in the deploying mechanism 522 structure to compensate for the greater distance traveled in a curve compared to a straight line.

In some embodiments, the deployment of the pod 540 may occur from a predetermined number of locations within the seedling box 520. In some aspects, the deploying mechanism 522 may consist of a number of deploying mechanisms 522. For example, the deploying mechanism 522 may be one continuous set of deploying mechanisms 522 that lead to a singular deployment location in the center of the drone. In another example, there may be a number of deploying mechanisms 522 that operate in a parallel configuration and move the pods 540 from one end of the drone to the other and deploy the pods 540 consistently along one side of the drone. In another example, four deployment locations may exist at each corner of the drone. Deploying mechanisms 522 may be designed to alternate deployment of the pods 540 via the four deployment locations. Deploying mechanisms 522 may be designed to accommodate a range of pods 540 and seedlings 530, such as through interchangeable parts or flexible composition materials, as non-limiting examples.

In some implementations, the seedling box 520 may contain a counterweight mechanism to maintain a horizontal orientation of the drone. In some embodiments, the drone may comprise a device that detects the horizontal orientation of the drone and activates a form of compensation if the drone begins to experience a significant amount of tilt. Significant amounts of tilt may affect the drone's ability to accurately deploy the pods 540, increase wear on rotors and motors, and disrupt flight pattern accuracy, as non-limiting examples.

For example, a sensor that detects tilt may relay signals to the drone rotors to exert higher amounts of thrust to compensate for the imbalance. In another example, when the drone begins to tilt, a sensor may send a signal to a series of motors that rotate horizontal lead screws mounted with weights. The horizontal translation of these weights may continue until the sensor detects a reduced tilt within a predetermined tolerance.

Figure 6E:
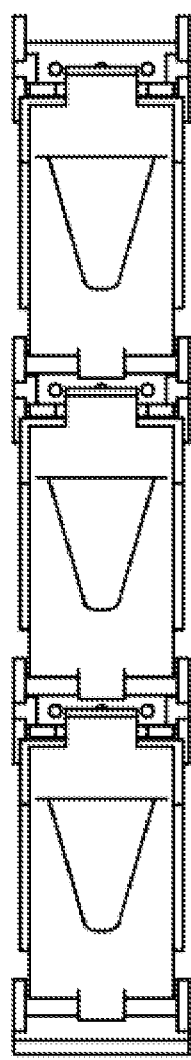
FIG. 6E illustrates exemplary loading mechanisms, according to some embodiments of the present disclosure.
Figure 6F:
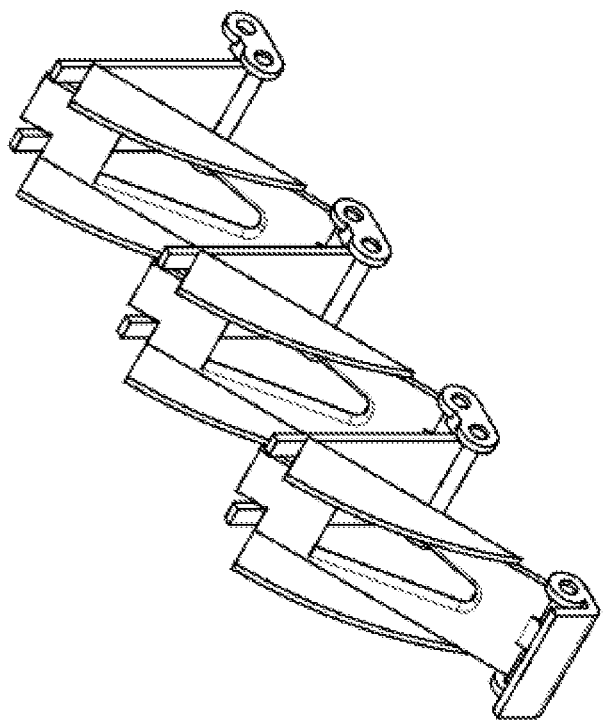
FIG. 6F illustrates exemplary loading mechanisms, according to some embodiments of the present disclosure.

Referring now to FIG. 6A, an exemplary deploying mechanism 622 is illustrated. In some embodiments, the loading mechanism 623 may be coupled to the deploying mechanism 622. In some implementations, the loading mechanism 623 may be oriented at an angle congruent to the pod 640 to allow the pod 640 to deploy vertically. This may allow the seedling 630 to mature effectively by growing vertically after being planted.

Referring now to FIG. 6B, an exemplary deploying mechanism 622 is illustrated. In some embodiments, the deploying mechanism 622 may comprise components that transport the pods linearly to be deployed sequentially. In some aspects, the deploying mechanism 622 may contain a mechanical indicator that notifies the drone when a segment of pods has been deployed.

For example, the deploying mechanism 622 may contain four rows of pods that deploy in an ordered sequence. When a row of pods has been deployed, that row flips a mechanical switch that indicates to the drone that the row is depleted of pods. When the final row in the sequence finishes deploying the remaining pods and the corresponding switch is triggered, the drone may be notified that all of the pods are deployed and it returns to a loading location. The switch may comprise a sensor, such as a pressure sensor or an infrared sensor, that detects when the row is depleted and activates the switch.

Referring now to FIGS. 6C-6F, an exemplary loading mechanism 623 is illustrated. In some embodiments, the loading mechanism 623 may comprise hinged segments that, while extended, remain in a stable state to hold the pods 640. In some embodiments, after the pod 640 is deployed, the loading mechanism 623 may begin to transition towards the underside of the deploying mechanism 622. Without the forces of gravity and the weight of the pod 640, the structure of the loading mechanism 623 may collapse from a rigid orientation to a series of hinged segments that move flexibly with the movement of the undercarriage of the deploying mechanism 622. In some implementations, the loading mechanism 623 may be oriented at an angle congruent to the pod 640 to allow the pod 640 to deploy vertically. This may allow the seedling 630 to grow correctly by growing vertically after being planted.

Figure 7A:
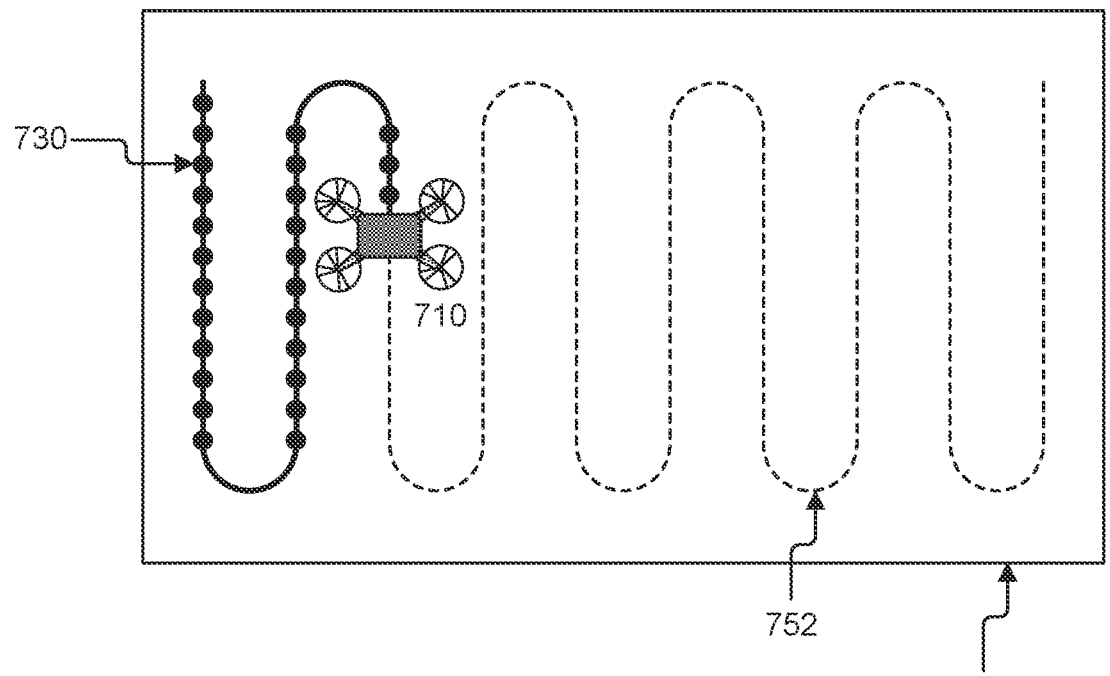
FIG. 7A illustrates exemplary drone deploying pods according to a flight path within a planting area, according to some embodiments of the present disclosure.

Referring now to FIG. 7A, an exemplary drone 710 deploying pods 740 according to a flight path 752 within a planting area 750 is illustrated. In some embodiments, the flight path 752 may be configured automatically based upon a preliminary scan of the planting area 750, by either the drone 710 or an external device. In some aspects, the seedlings 730 may be spaced by a defined distance to ensure consistency in adequate seeding a defined planting area 750. In some implementations, the flight path 752 may comprise designated planting locations and navigational portions of flight. For example, a drone may deploy numerous seedlings along a straight line of the flight path and then navigate a curve without deploying additional pods until the next straight line of deployment has been reached.

Figure 7B:
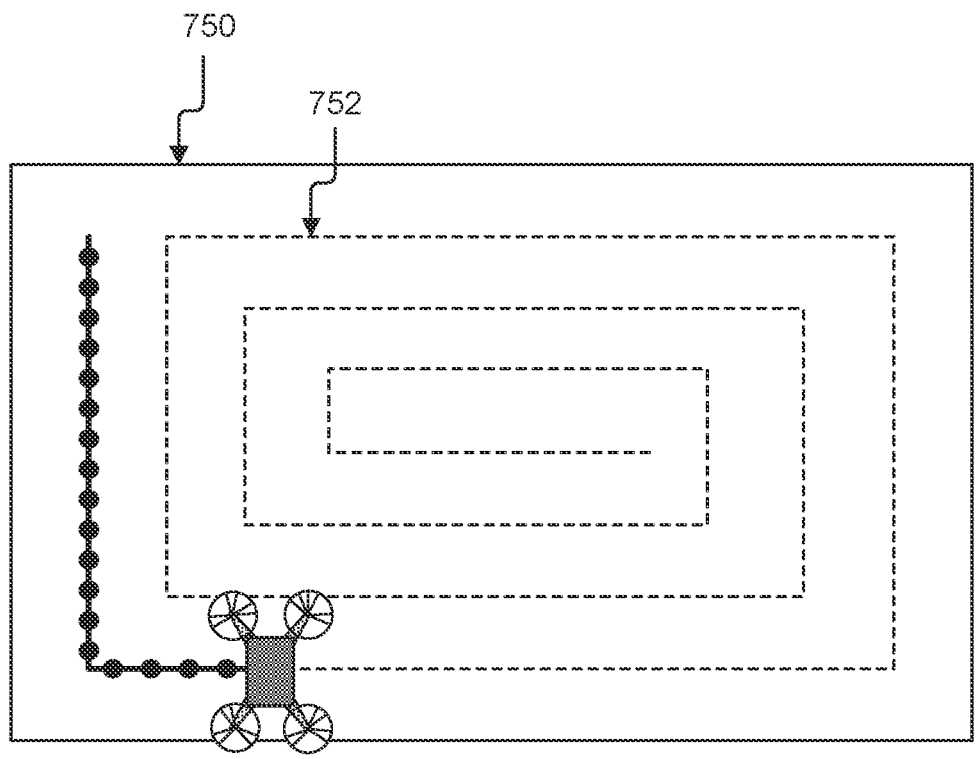
FIG. 7B illustrates exemplary drone deploying pods according to a flight path within a planting area, according to some embodiments of the present disclosure.

Referring now to FIG. 7B, an exemplary drone 710 deploying pods 740 according to a flight path 752 within a planting area 750 is illustrated. In some embodiments, the flight path 752 may vary in orientation. For example, the flight path 752 may best utilize a circular pattern around the base of a mountain and it may be most effective as a series of rows for a deforested location that may require a specific configuration of seedlings to prevent issues such as erosion.

Figure 8A:
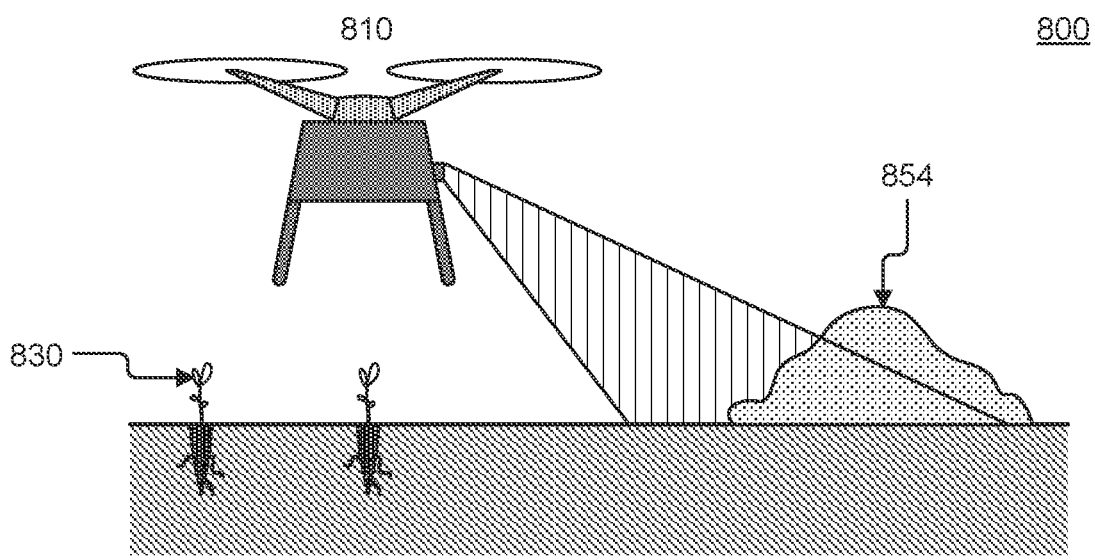
FIG. 8A illustrates exemplary drone navigating planting obstacles while deploying pods in the planting area, according to some embodiments of the present disclosure.
Figure 8B:
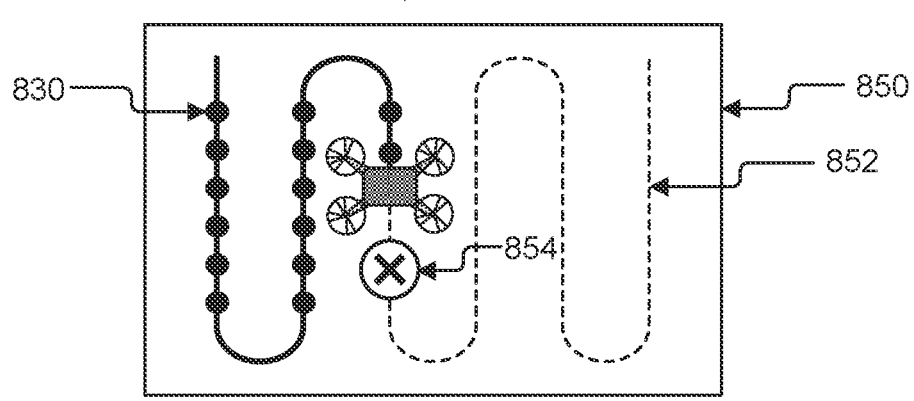
FIG. 8B illustrates exemplary visualization of drone navigating planting obstacles while deploying pods in the planting area, according to some embodiments of the present disclosure.
Figure 8C:
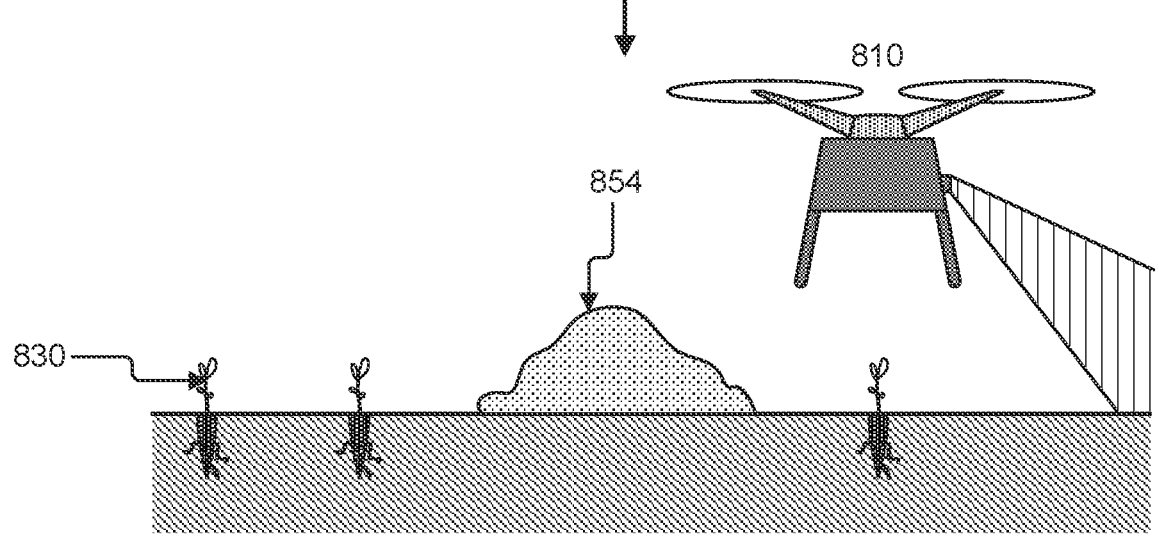
FIG. 8C illustrates exemplary drone navigating planting obstacles while deploying pods in the planting area, according to some embodiments of the present disclosure.

Referring now to FIGS. 8A and 8C, an exemplary drone 810 navigating planting obstacles 854 while deploying seedlings 830 in the planting area 850 is illustrated. In some embodiments, the drone 810 may utilize a method of detection to verify the validity of a designated planting location along a predetermined flight path 852. In some aspects, this may occur in the process of deploying seedlings 830 along the flight path 852.

For example, as a seedling 830 is deployed and the drone 810 is moving to the next predesignated deployment locations, the drone 810 may scan the next planting location prior to deployment to ensure there are no rocks or similar obstructions that may prevent the successful planting of the seedlings 830 after deployment. In some embodiments, the drone 810 may withhold a pod 840 from deployment when a planting obstacle 854 is detected. Detection may occur via a detecting sensor. In some implementations, the pod 840 withheld may be deployed in the subsequent planting locations that is free of planting obstacles 854. In some aspects, the flight path 852 may contain a predesignated number of planting locations and there may be undeployed pods 840 remaining when planting obstacles 854 inhibit pod 840 deployment.

Referring now to FIG. 8B, an exemplary visualization of drone 810 navigating planting obstacles 854 while deploying seedlings 830 in the planting area 850 is illustrated. In some embodiments, the flight path 852 may dynamically create markers indicating the locations of planting obstacles 854. In some implementations, the obstacle marker may be stored within the internal memory of the drone 810. In some aspects, the obstacle marker and flight path 852 information may be transmitted from the drone 810 to an external device.

For example, someone may oversee the planting efforts of multiple drones 810 and assess their performance via electronic user interface on an external device. In some implementations, the obstacle marker and flight path 852 may be transferable from the drone. For example, after completing flight path, the drone 810 may return to a location where a user may connect a cord to the drone 810 and extract the completed flight information. This may be a helpful method of analyzing completed flight paths 852 for consistency. This may allow systematic or recurring patterns to become more easily recognized and improved upon more effectively.

Figures 9A, 9B, 9C:
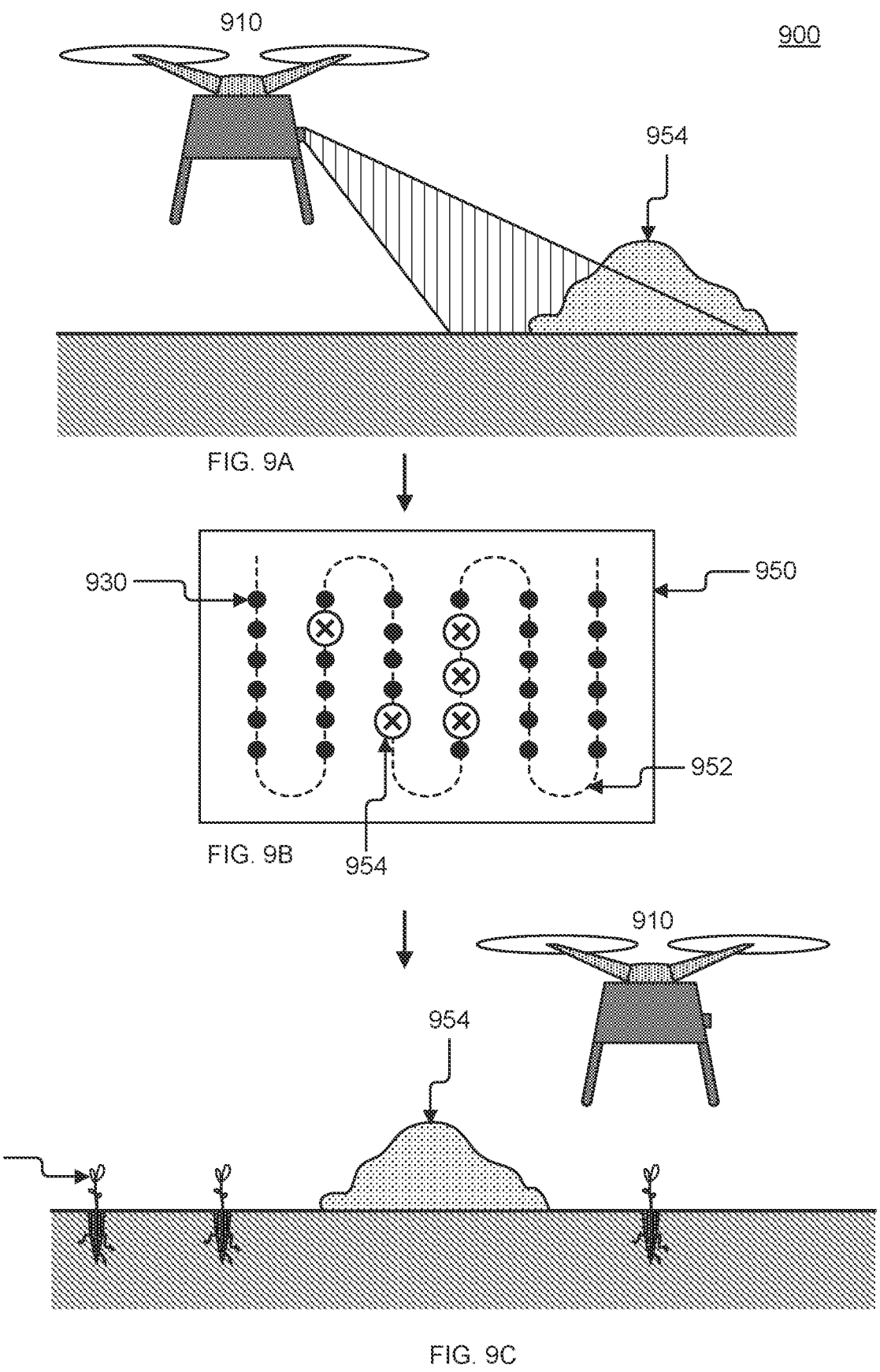
FIG. 9A illustrates exemplary drone identifying planting obstacles while deploying pods in the planting area, according to some embodiments of the present disclosure.
FIG. 9B illustrates exemplary visualization of drone navigating planting obstacles while deploying pods in the planting area, according to some embodiments of the present disclosure.
FIG. 9C illustrates exemplary drone navigating planting obstacles while deploying pods in the planting area, according to some embodiments of the present disclosure.

Referring now to FIGS. 9A-9C, an exemplary drone 910 identifying planting obstacles 954 while deploying seedlings 930 in the planting area 950 is illustrated. In some embodiments, the drone 910 may complete a scan of the intended flight path 952 and create markers indicating the locations of planting obstacles 954. This may occur in preparation for drone delivery, when the flight path 852 may be determined.

As an illustrative example, a drone 910 may be directed to a planting area 950 and may commence in scanning the intended planting locations. This information may then be utilized in the deployment process to skip locations previously identified as containing planting obstacles 954. This may improve efficiency by reducing the time between each pod 940 deployment. This reduced deployment time may result in larger potential planting areas 950 and more seedlings 930 deployed per battery charge.

In some embodiments, the flight path information may be transmitted from the drone 910 to an external device. For example, someone may oversee the planting efforts of multiple drones 910 and assess their performance via electronic user interface on an external device. This would provide the user with an opportunity to review and revise an intended flight path 952 and any associated planting obstacles 954 before pod 940 deployment. For example, a drone 910 may misinterpret a depression in the ground as an unplantable location, but upon review from the user, the planting obstacle 954 marker may be removed so the drone 910 resume deploying pods 940 in the specified location.

In some implementations, the drone 910 may register planting obstacles 954 via a detecting sensor. For example, the drone 910 may use an infrared sensor to detect shapes or forms that may represent planting obstacles 954. In another example, the drone 910 may be equipped with distance sensor and mark obstacles that may create a significant difference in distance from the drone 910 to the ground, assuming the height of the drone 910 is known. In some aspects, the drone 910 may contain an image capture device. The images captured may be compared to an algorithm that identifies planting obstacles 954.

In some embodiments, the images captured by the drone 910 may be transmitted with associated planting obstacle 954 markers to an external device utilized by a user. The user may utilize the images associated with planting obstacle 954 markers to decide if a marker should remain a designated planting omittance within the flight path 952. In some embodiments, the drone 910 may navigate the flight path 952 and skip locations marked with planting obstacle 954 markers. The external device may also allow the user to interrupt the determined flight path 952 to manually revisit a location with a planting obstacle 954 marker and then allow the user to direct the drone 910 back onto the determined flight path 952.

Figure 10C:
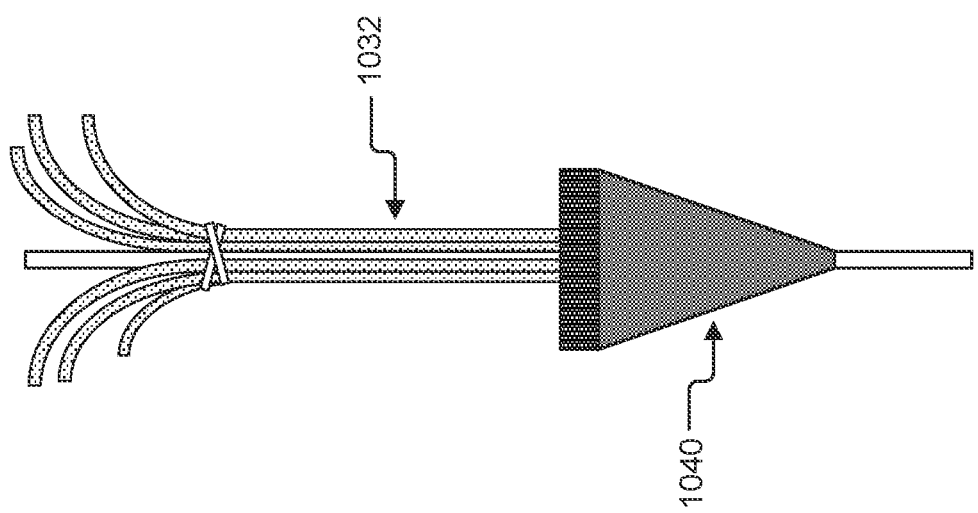
FIG. 10C illustrates exemplary pods with seedlings, according to some embodiments of the present disclosure.
Figure 10B:
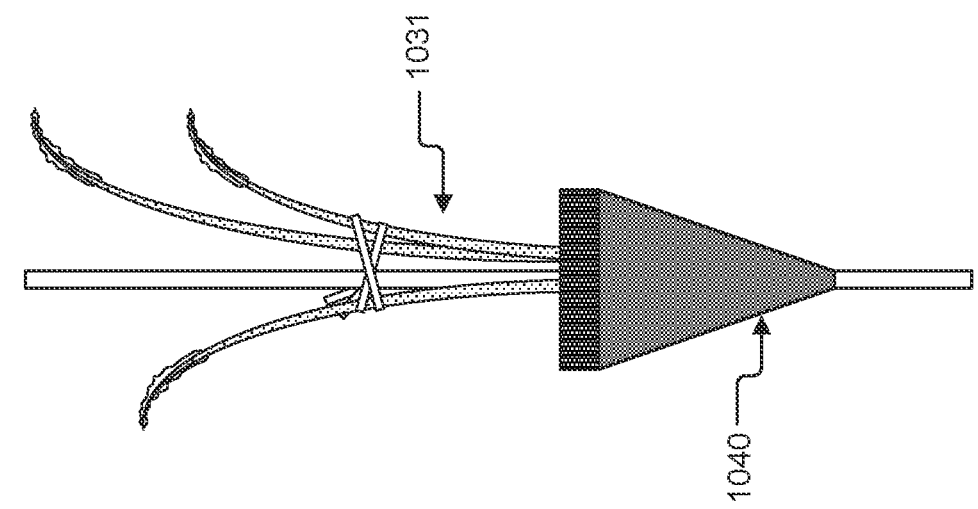
FIG. 10B illustrates exemplary pods with seedlings, according to some embodiments of the present disclosure.
Figure 10A:
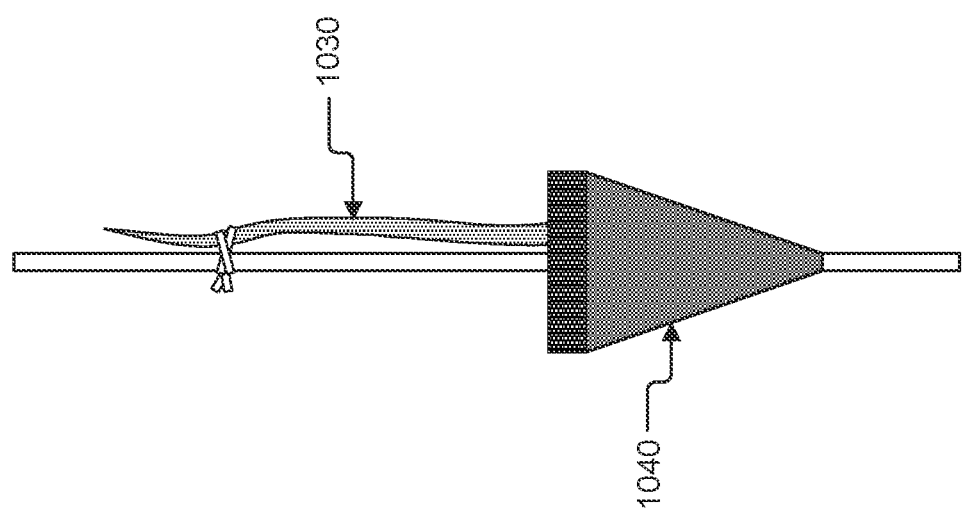
FIG. 10A illustrates exemplary pods with seedlings, according to some embodiments of the present disclosure.

Referring now to FIGS. 10A-10C, various pods 1040 with seedlings 1030, 1031, 1032 are illustrated. In some embodiments, the pod 1040 may contain a vertical shaft 1046 that may support the upright orientation and may assist the growth of the seedling 1030, 1031, 1032. In some implementations, the pod 1040 may degrade over time as the seedling 1030 begins to take root and grow. In some aspects, the vertical shaft 1046 may fall away from the seedling 1030 as the supporting structure of the pod 1040 and the binding device to the seedling 1030 decompose.

In some embodiments, the seedling 1030 may be inserted at a shallow depth within the pod 1040 to allow space for the roots to grow and utilize the nutrients provided by the fertilizer within the pod 1040. In some implementations, the vertical shaft 1046 may provide structural support when the seedling 1030 is inserted at a shallow depth within the pod 1040. In some aspects, the pod 1040 may not contain a vertical shaft 1046 when the seedling 1030 is inserted deep within the pod 1040.

Figure 11:
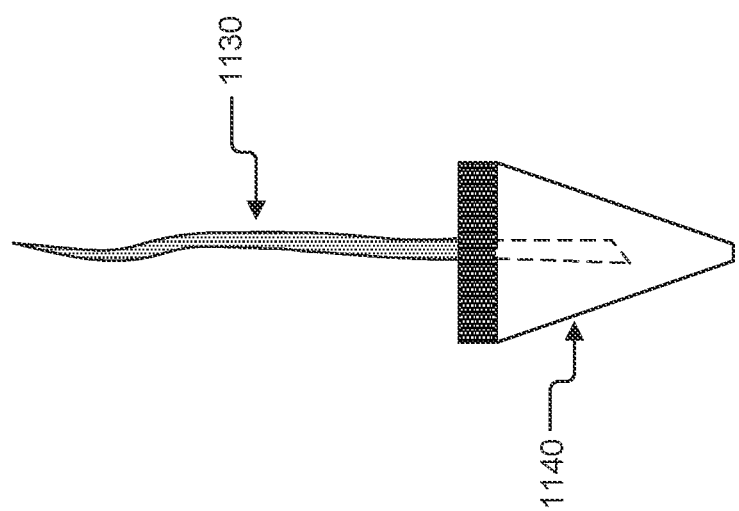
FIG. 11 illustrates an exemplary pod with seedling, according to some embodiments of the present disclosure.

Referring now to FIG. 11, a pod 1140 with seedling 1130 is illustrated. In some aspects, a pod 1140 may comprise a rigid top portion that may secure the seedling 1130 to the pod 1140. The pod 1140 may comprise a fertilizing medium, such as peat, that may surround the seedling 1130. Once planted, the fertilizing medium may dissolve into the ground allowing the seedling to grow in a nutrient-rich environment.

Figure 12:
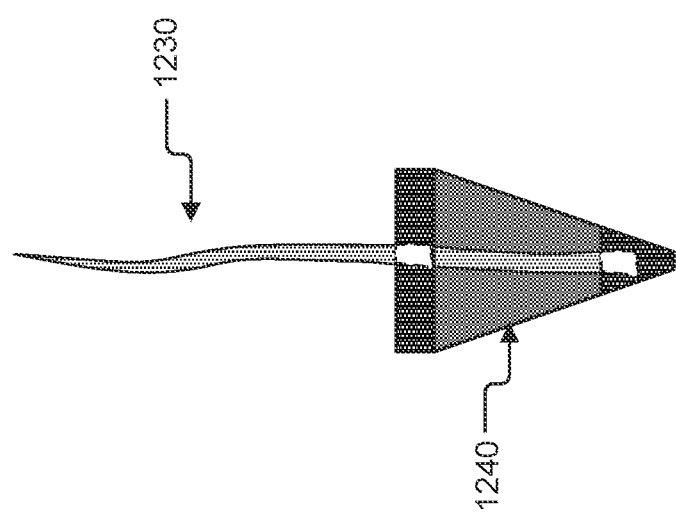
FIG. 12 illustrates an exemplary pod with seedling, according to some embodiments of the present disclosure.

Referring now to FIG. 12, a pod 1240 with seedling 1230 is illustrated. In some aspects, a pod 1240 may comprise a rigid top portion and a weighted base. A seedling 1130 may be anchored within the rigid top portion and weighted base. A fertilizing medium may connect the rigid top portion and the weighted base. The fertilizing medium may provide nutrients to the seedling 1230 once planted.

Figure 13B:
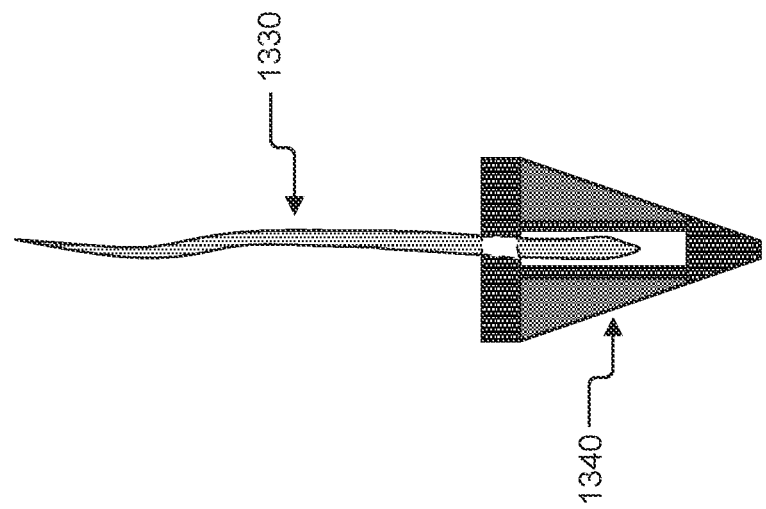
FIG. 13B illustrates an exemplary pod with seedling, according to some embodiments of the present disclosure.
Figure 13A:
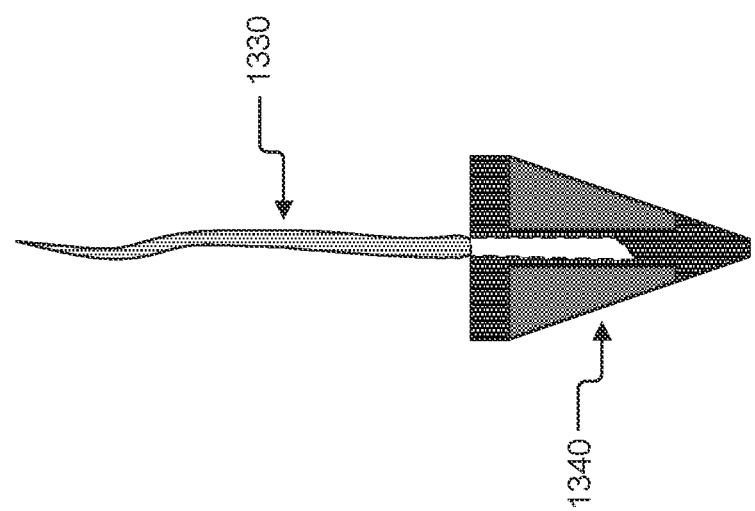
FIG. 13A illustrates an exemplary pod with seedling, according to some embodiments of the present disclosure.
Figure 15A:
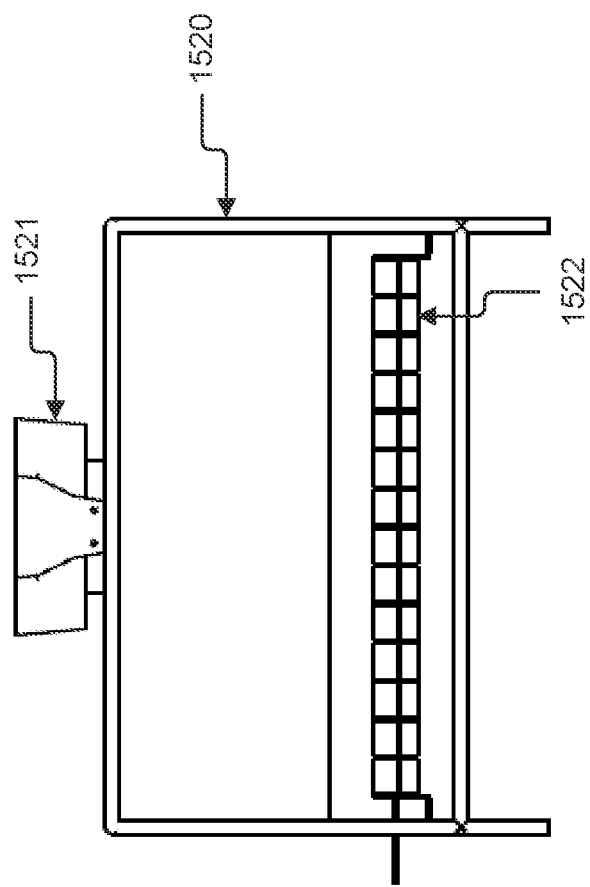
FIG. 15A illustrates exemplary seedling box with an attachment container, according to some embodiments of the present disclosure.
Figure 15B:
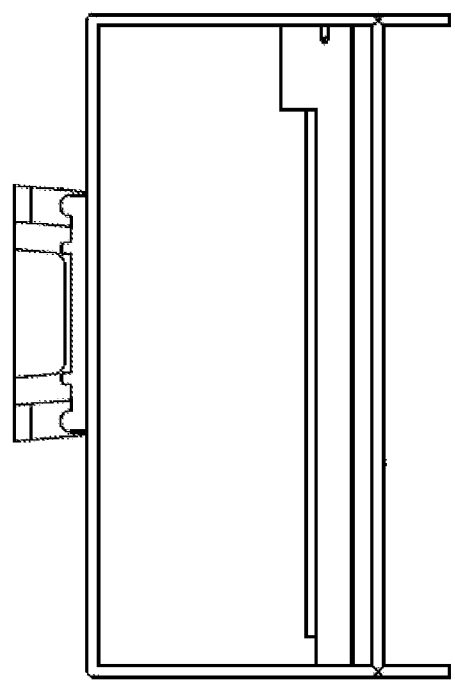
FIG. 15B illustrates exemplary seedling box with an attachment container, according to some embodiments of the present disclosure.
Figure 15D:
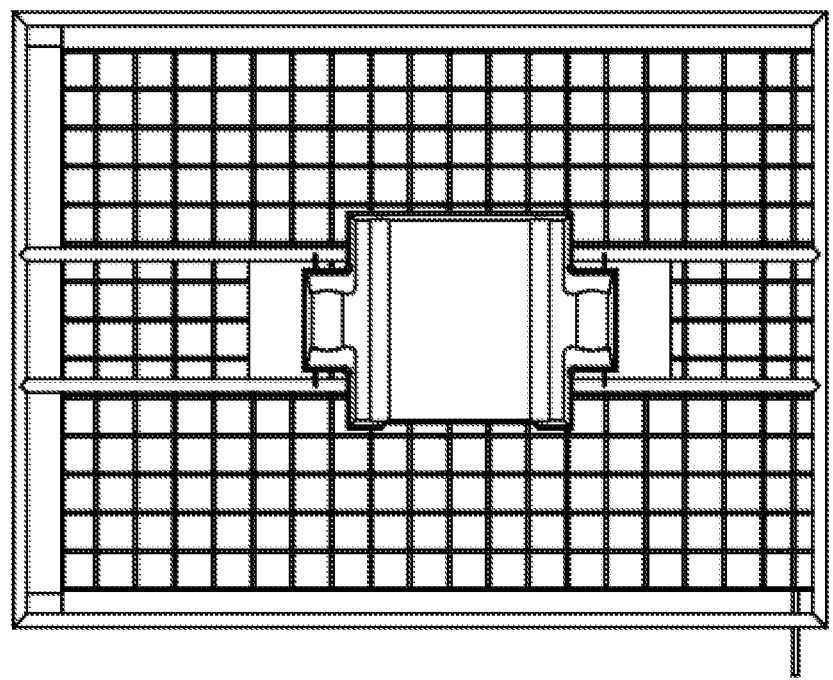
FIG. 15D illustrates exemplary seedling box with an attachment container, according to some embodiments of the present disclosure.
Figure 15C:
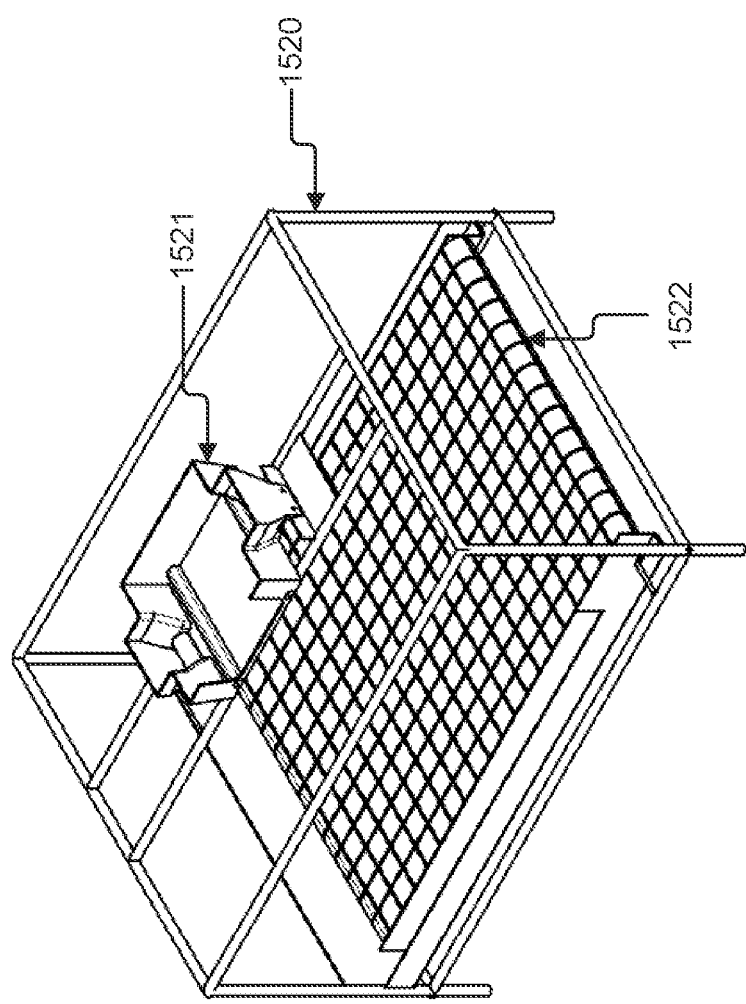
FIG. 15C illustrates exemplary seedling box with an attachment container, according to some embodiments of the present disclosure.
Figure 16D:
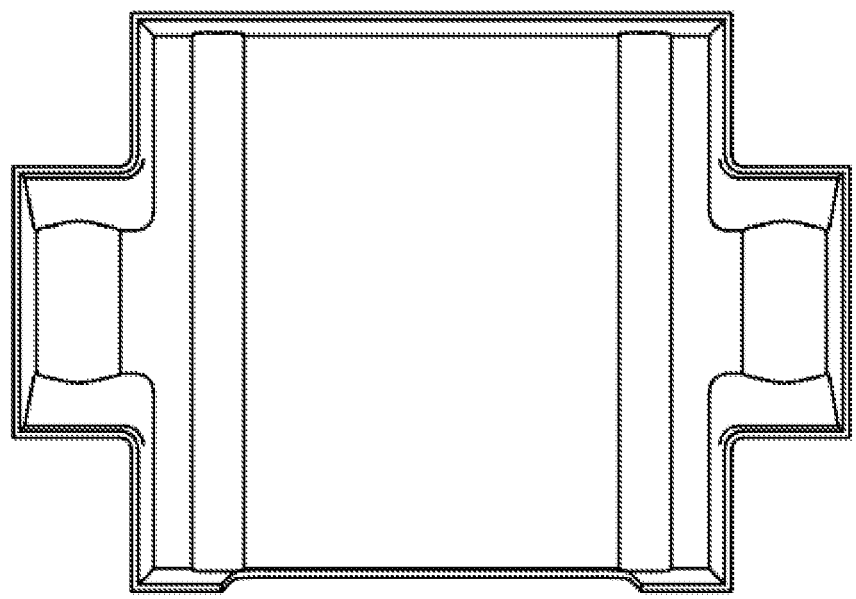
FIG. 16D illustrates exemplary attachment container, according to some embodiments of the present disclosure.
Figure 16C:
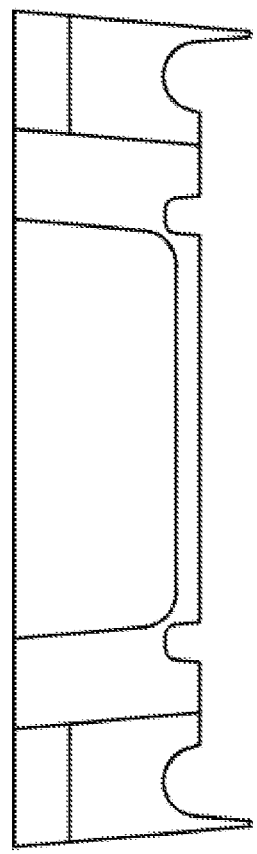
FIG. 16C illustrates exemplary attachment container, according to some embodiments of the present disclosure.
Figure 17A:
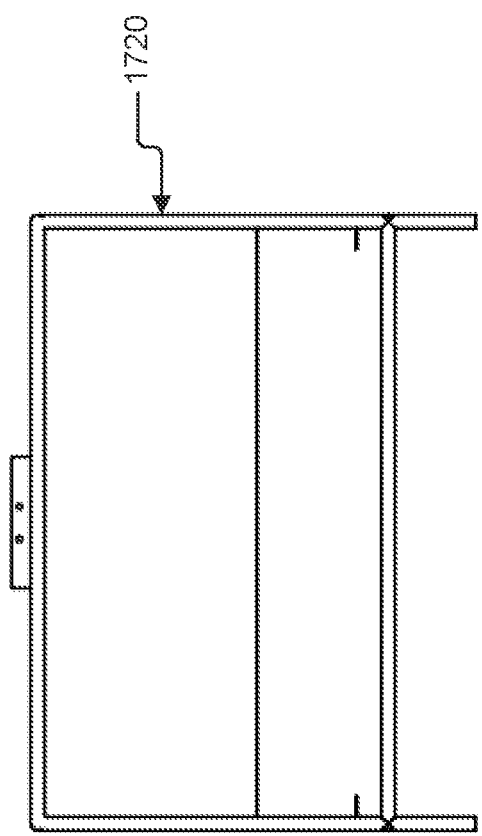
FIG. 17A illustrates exemplary seedling box, according to some embodiments of the present disclosure.
Figure 17B:
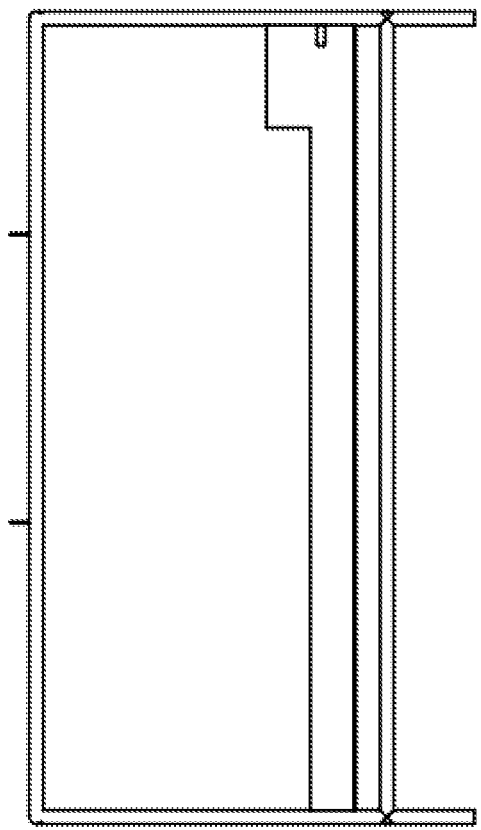
FIG. 17B illustrates exemplary seedling box, according to some embodiments of the present disclosure.
Figure 17D:
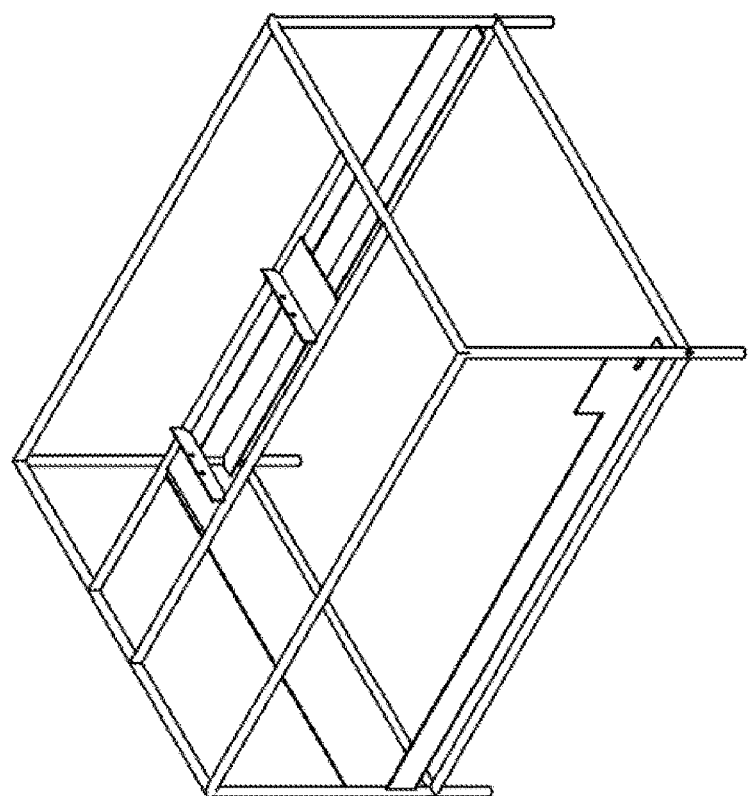
FIG. 17D illustrates exemplary seedling box, according to some embodiments of the present disclosure.
Figure 17C:
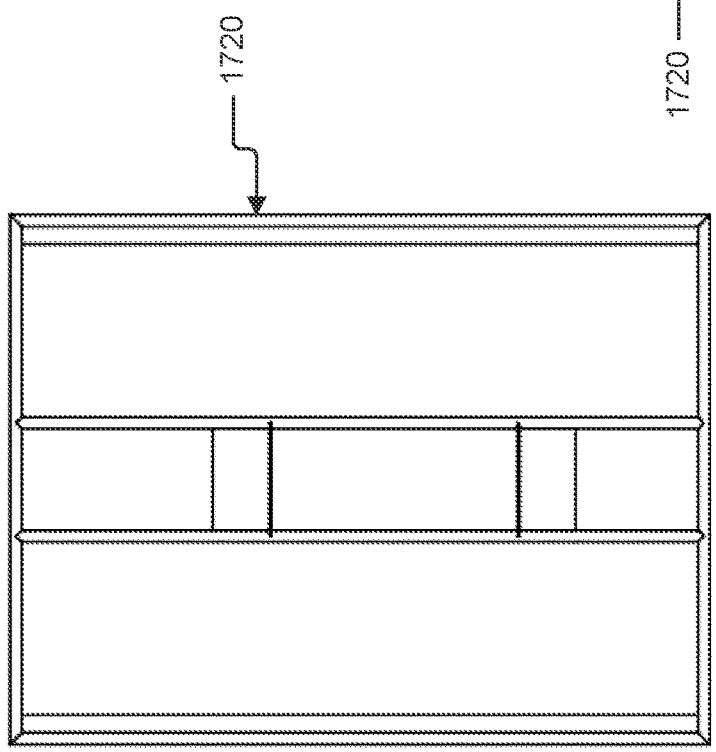
FIG. 17C illustrates exemplary seedling box, according to some embodiments of the present disclosure.
Figure 18A:
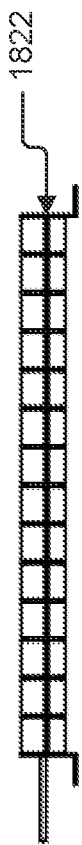
FIG. 18A illustrates exemplary deploying mechanism, according to some embodiments of the present disclosure.
Figure 18B:
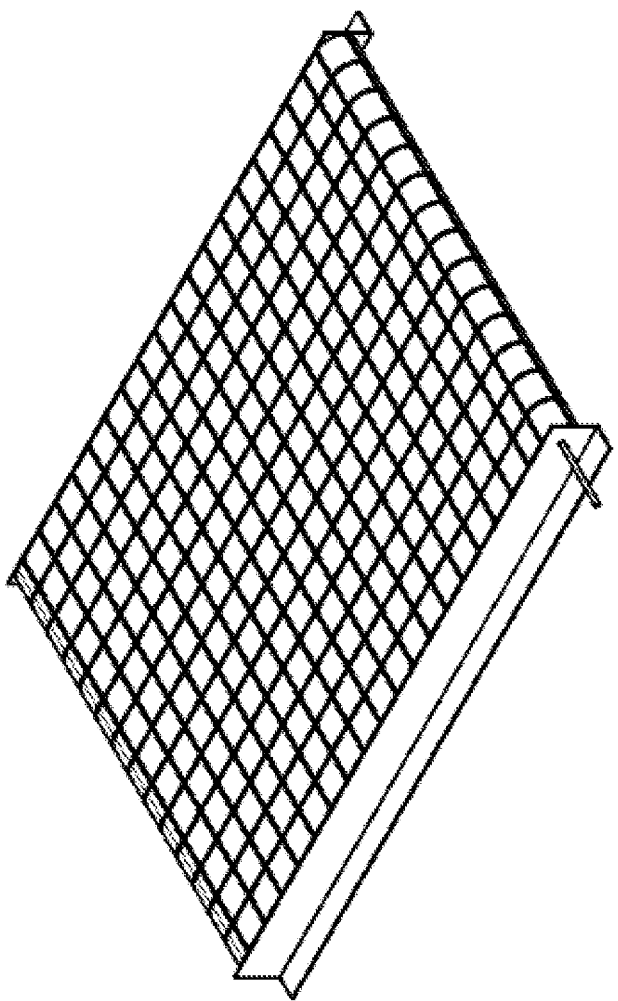
FIG. 18B illustrates exemplary deploying mechanism, according to some embodiments of the present disclosure.
Figure 18C:
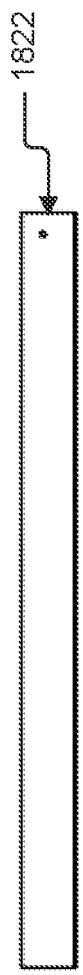
FIG. 18C illustrates exemplary deploying mechanism, according to some embodiments of the present disclosure.
Figure 18D:
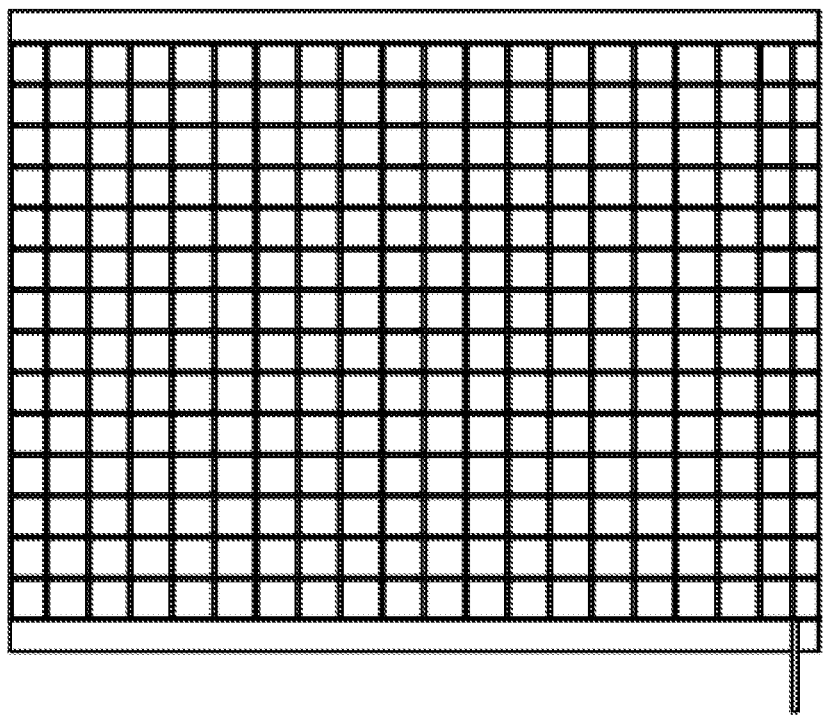
FIG. 18D illustrates exemplary deploying mechanism, according to some embodiments of the present disclosure.

Referring now to FIGS. 13A and 13B, a pod 1340 with seedling 1330 is illustrated. In some embodiments, a pod 1340 may comprise a solid rigid top connected to a weighted base. A seedling 1330 may extend into the rigid top surrounded by a fertilizing medium. The seedling 1330 may not extend into the weighted base, which may allow for a faster rooting of the seedling 1330 into the ground when planted.

Referring now to FIG. 14, an exemplary drone 1410 is illustrated. In some embodiments, the seedling box 1420 may be separate from the drone 1410. In some aspects, a battery may be included in the detached seedling box 1420. For example, the battery may be located in the attachment container 1421 that may connect to the drone 1410 when the seedling box 1420 is connected. In some implementations, the drone 1410 may contain a primary power source that may be supplemented by a secondary power source contained within the seedling box 1420. This may provide the extra power required to sustain the additional weight of the seedling box 1420 and its contents for the duration of deployment within the designated planting area. The secondary power source may be removeable for charging via an external device.

In some embodiments, the drone 1410 may contain extended rods that could may to the attachment container 1421. For example, the drone 1410 may possess hinged, looped tubes of metal that may be extended to horizontal orientation when the drone 1410 flies without a seedling box 1420 and that extend vertically to carry a seedling box 1420. The loops may lift the seedling box 1420 by the underside of extrusions on either side of the attachment container 1421.

In some implementations, the drone 1410 may comprise biodegradable materials. This may protect the environment if the seedling box 1420 or drone 1410 fails during deployment in a planting area to the extent that it cannot return from the area and is irretrievable for recovery. A drone 1400 may be able to detect when it is at risk of crashing and may release the seedling box 1420. In some aspects, release of the biodegradable seedling box 1420 may allow the drone 1410 to restabilize and return safely.

Referring now to FIGS. 15A-15D, an exemplary seedling box 1520 with an attachment container 1521 is illustrated. In some embodiments, the attachment container 1521 may connect to an interface that is integrated with the frame of the seedling box 1520. In some embodiments the deploying mechanism 1522 may be elevated from the base of the seedling box 1520 frame to provide space for used loading mechanisms 1523 to rotate after deploying pods 1540. In some aspects, the rotation that returns the loading mechanisms 1523 to be loaded with additional pods 1540 may be at an angle that may reconfigure the loading mechanisms 1523 into a stable, loading position.

Referring now to FIGS. 16A-16D, an exemplary attachment container 1621 is illustrated. In some embodiments, the attachment container 1621 may possess external mechanical features to secure the seedling box 1620 to the drone. In some implementations, the attachment container 1621 may utilize a pressure-induced snapping mechanism for securing the seedling box 1620 to the drone 1610. In some aspects, a power source may exist within the attachment container 1621 that connects to the drone 1610 via removeable electrical connection.

In some embodiments, the power source may be interchangeable to allow for replacement when the power source lacks sufficient power. In some implementations, the attachment container 1621 may contain release points to allow for remote separation of the seedling box 1620 and the drone 1610. For example, the seedling box 1620 may function improperly to the extent that it is advisable to detach the seedling box 1620 and allow the drone 1610 to return to the user without the seedling box 1620.

Referring now to FIGS. 17A-17D, an exemplary seedling box 1720 with an attachment container 1721 is illustrated. In some embodiments, the seedling box 1720 may comprise the form of a frame of structural beams. For example, the walls of the seedling box 1720 may exist as a shell that could be placed over the frame as a part of the attachment container 1721.

In some implementations, the walls of the seedling box 1720 may comprise as separate components. In some aspects, the side walls may be easily removeable for adjusting content within the seedling box 1720. For example, the walls of the seedling box 1720 may magnetically snap into place to allow for removal of the walls. In some embodiments, the walls of the seedling box 1720 may slide into place via interlocking grooves.

In some embodiments, the top cover of the seedling box 1720 may be connected to the attachment container 1721 and open as a lid to the seedling box 1720. This may allow for convenient access to the contents of the seedling box 1721. In some implementations, the seedling box 1720 may comprise biodegradable materials. This may protect the environment in the event that the seedling box 1720 or drone 1710 fails during deployment in a planting area to the extent that it cannot return to the user and is irretrievable for recovery.

Referring now to FIGS. 18A-18D, an exemplary deploying mechanism 1822 is illustrated. In some embodiments, the deploying mechanism 1822 may comprise a plurality of deploying mechanisms 1822. For example, one deploying mechanism 1822 may deploy pods from a drone and four smaller deploying mechanisms 1822 may operate perpendicular to the singular deploying mechanism 1822 to sequentially transfer additional pods to the active deployment mechanism 1822. This distribution may improve the balance of the drone as the pods are deployed. An increased quantity of deploying mechanisms 1822 may improve minute control of the pattern of pod deployment.

In some implementations, the deploying mechanism 1822 may comprise an extruded structure for interfacing with a loading mechanism. In some aspects, the deploying mechanism 1822 may contain a hollow cavity to allow for the insertion of the loading mechanism. For example, the deploying mechanism 1822 may operate as a rotating belt that contains a frame that connects via applied force to a secondary belt containing loading mechanisms or segment of loading mechanisms. In another example, the deploying mechanism 1822 could contain slots for the placement of singular loading mechanisms.

Referring now to FIGS. 19A-19C, an exemplary seedling box 1920 is illustrated. In some embodiments, a seedling box 1920 may comprise a container or bag that may hold multiple pods 1930. In some implementations, the pods 1940 may be arranged through internal structure. In some aspects, the seedling box 1920 may be filled with pods without distinct organization. The seedling box 1920 may comprise a deploying mechanism 1922. The deployment mechanism 1922 sliding panel, wherein sliding the panel opens at least a portion of the base allowing for deployment of the pods 1940. In some aspects, sliding the panel may allow for free fall of multiple seedlings, such as any number that may fit through the opening. This may allow for mass deployment of pods 1940. Mass deployment may be preferred where spacing between seedlings may not be necessary, such as with grasses, including for example, sea grass, eel grass, and spartina grass.

Figure 20:
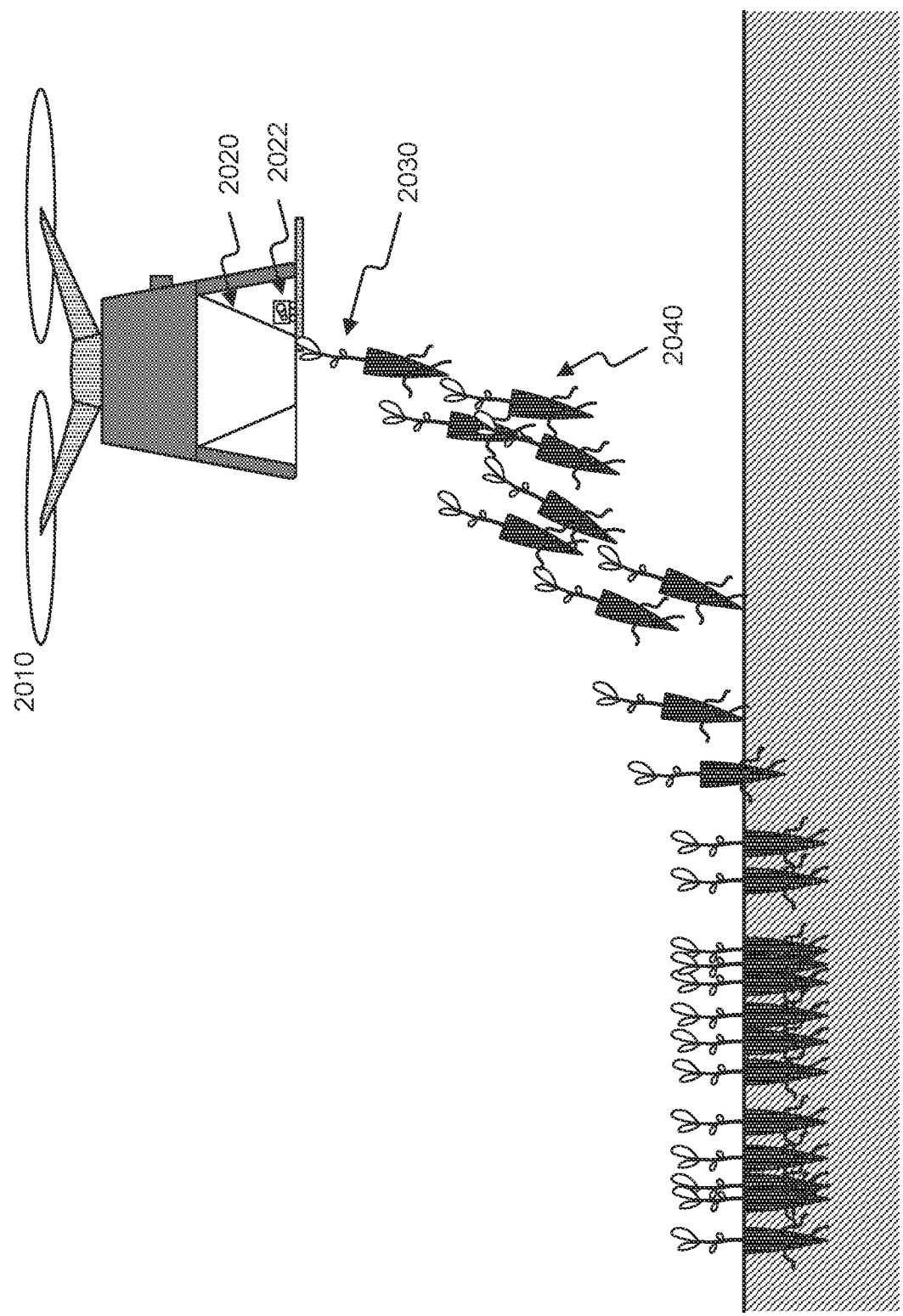
FIG. 20 illustrates an exemplary drone comprising a seedling box delivering seedlings, according to some embodiments of the present disclosure.

Referring now to FIG. 20, a drone 2010 comprising a seedling box 2020 is illustrated delivering seedlings 2000. In some aspects, a drone 2010 may deploy pods 2040 in bulk, where deployment may not provide for specific spacing of the seedlings 2030. In some aspects, activating the deployment mechanism 2022 may allow for the free fall of pods 2040 from the seedling box 2020. In some embodiments, broadcasting of pods 2040 may be preferable for some types of flora and scenarios. For example, grasses may be planted closer together than other types, such as mangroves. As another example, broadcasting may be preferable for large expanses of land where seedlings may be needed.

Figure 21:
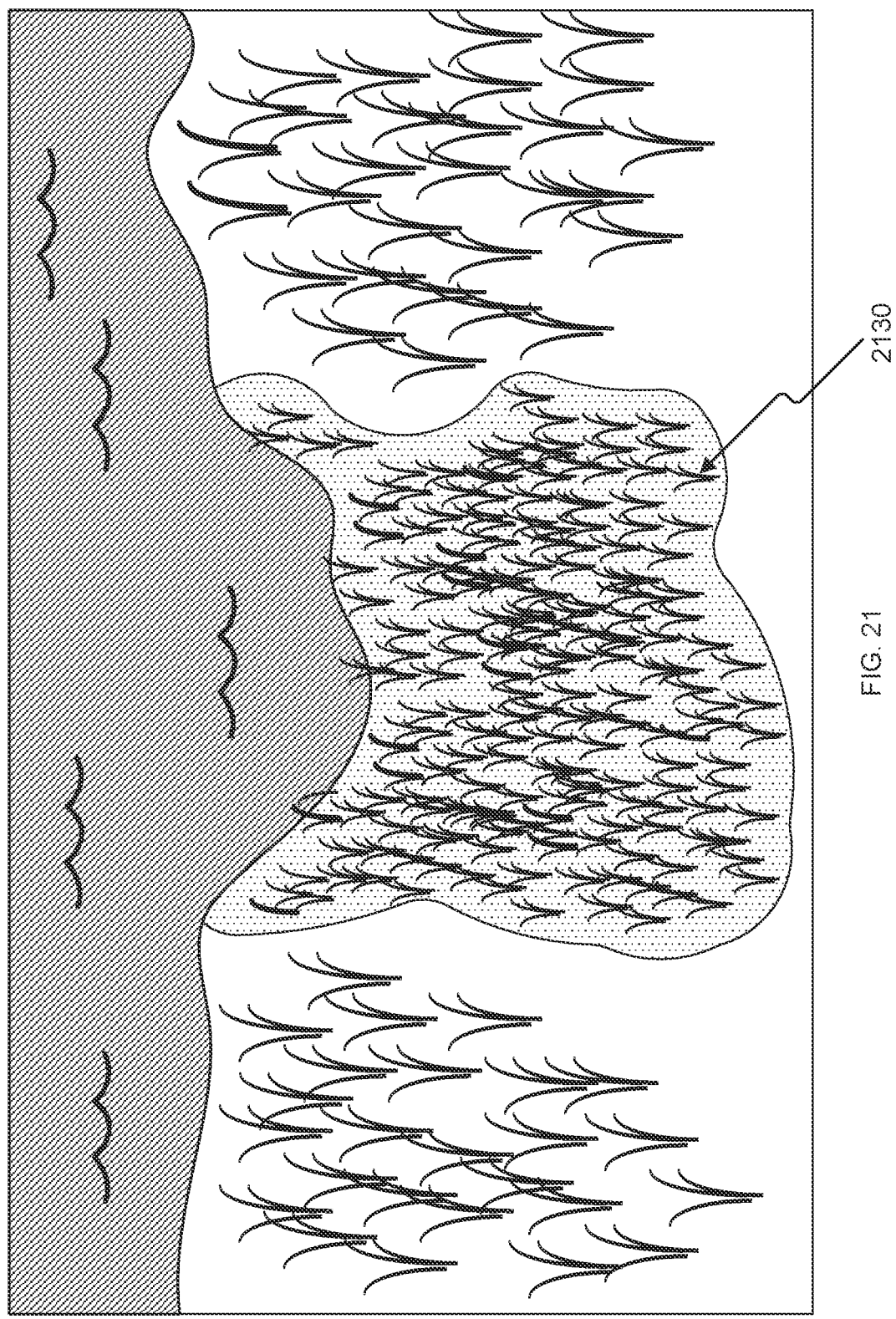
FIG. 21 illustrates an exemplary visualization of deployed seedling, according to some embodiments of the present disclosure.
Figure 22B:
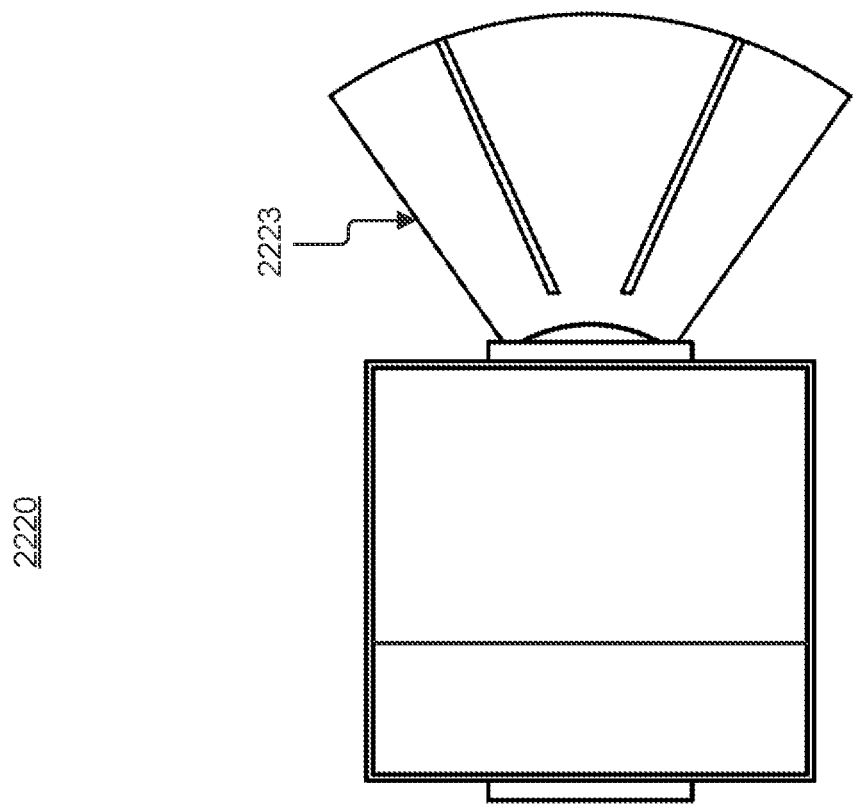
FIG. 22B illustrates an exemplary seedling box, according to some embodiments of the present disclosure.
Figure 22A:
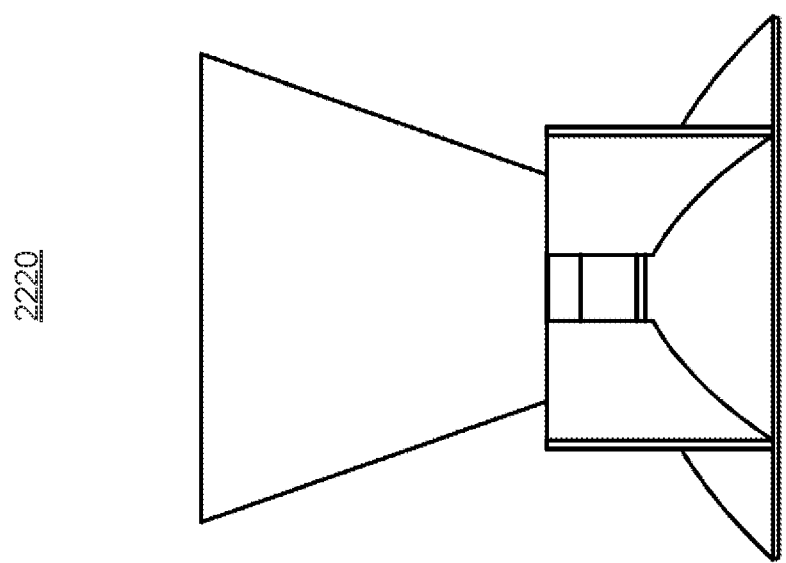
FIG. 22A illustrates an exemplary seedling box, according to some embodiments of the present disclosure.
Figure 22C:
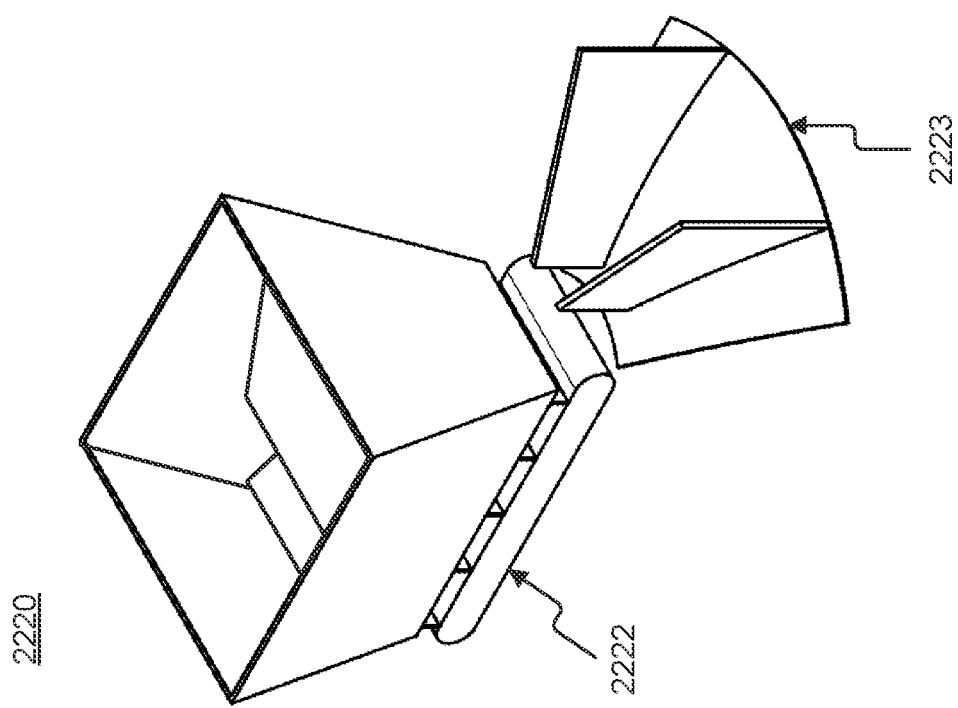
FIG. 22C illustrates an exemplary seedling box, according to some embodiments of the present disclosure.

Referring now to FIG. 21, an exemplary visualization of deployed seedlings 2130 is illustrated. In some aspects, deployment of a mass of seedlings 2130 may allow for quick and effective dispersal of seedlings within a predefined area, such as an area of sludge or damage caused by nature or man. Mass dispersal may be preferable to measured and spaced-out deployment in some situations and applications. As an illustrative example, a portion of a shoreline grasses may be damaged during high tide from a boat that runs aground or other machinery scraping the seafloor. This may leave a gap in grass growth that may need to be repaired. Where the damage is excessive and may include a hole, the hole may be filled with sand to allow for a level grow bed along the coast. A drone may be programmed to navigate within a designated space where broadcasting of seedlings 2130 may fill in the designated space during flight.

Referring now to FIGS. 22A-D, an exemplary seedling box 2220 is illustrated. In some embodiments, the seedling box 2220 may comprise a loading mechanism 2223. In some implementations, the seedling box 2220 may comprise a deploying mechanism 2222. In some aspects, the seedling box 2220 may interface with a drone 2210.

In some embodiments, the seedling box 2220 may be large enough to accommodate small aquatic organisms, such as oysters at varying stages of their life cycles. For example, the seedling box 2220 may be used to sift through and distribute oyster spat in order to more evenly implement oyster barriers along coastlines. This distribution could be accomplished by manual use of the seedling box 2220 or with a drone 2210.

In some implementations, there may be a filter located between and coupled to the loading mechanism 2223 and deploying mechanism 2222 so as to limit the number of seedlings being deployed at any given time. This filter may be interchangeable so as to accommodate for varying loads of seedlings. In some aspects, separation of the seedlings by the loading mechanism 2223 may allow the seedling deployment to be distributed evenly at a lighter density of seedlings per distribution. This may be of particular use when the seedlings may be smaller in size and may, as a result of size, more easily clump together.

Figure 23:
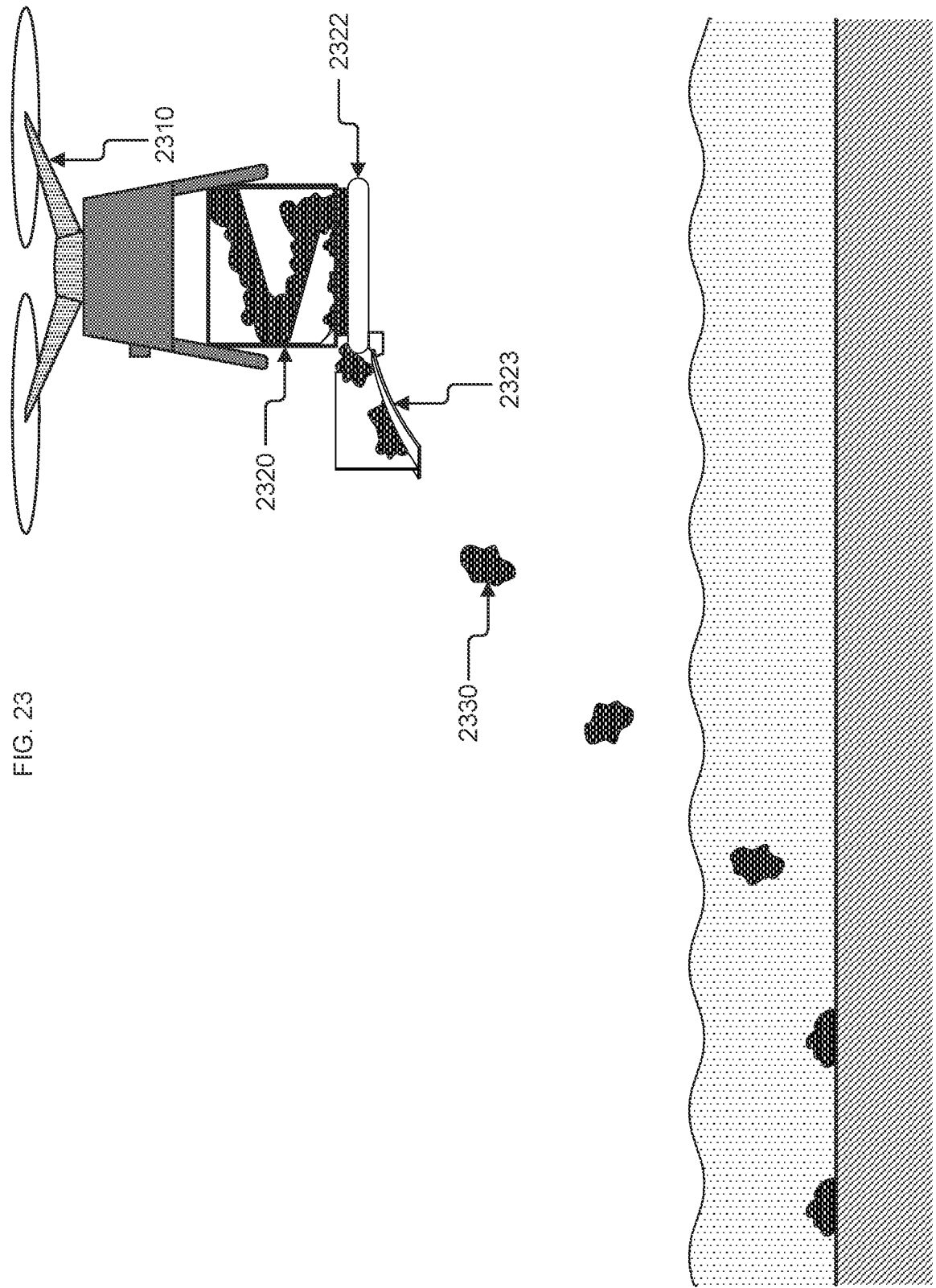
FIG. 23 illustrates an exemplary drone comprising a seedling box delivering seedlings, according to some embodiments of the present disclosure.
Figure 24A:
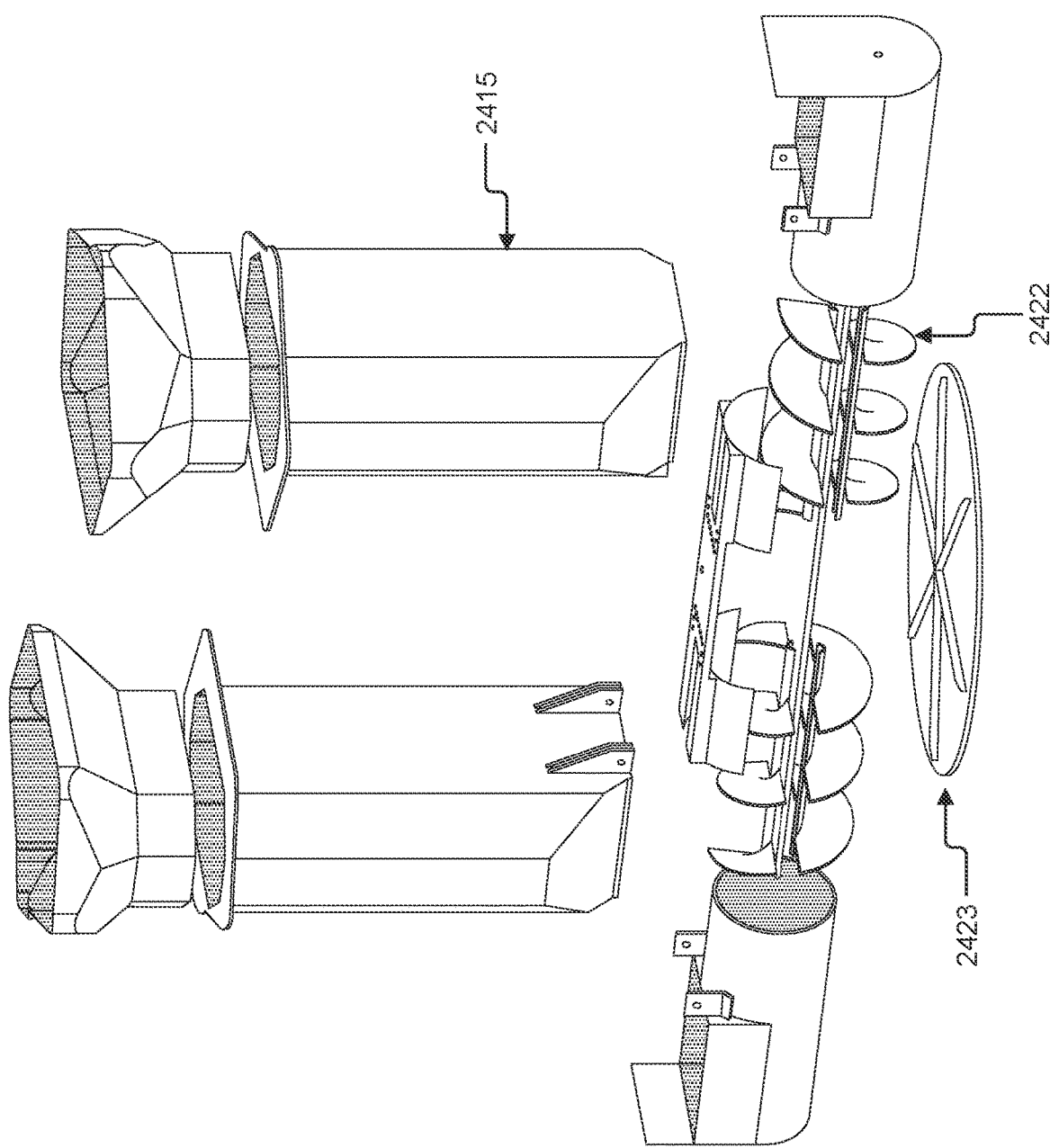
FIG. 24A illustrates an exemplary seedling box, according to some embodiments of the present disclosure.
Figure 24B:
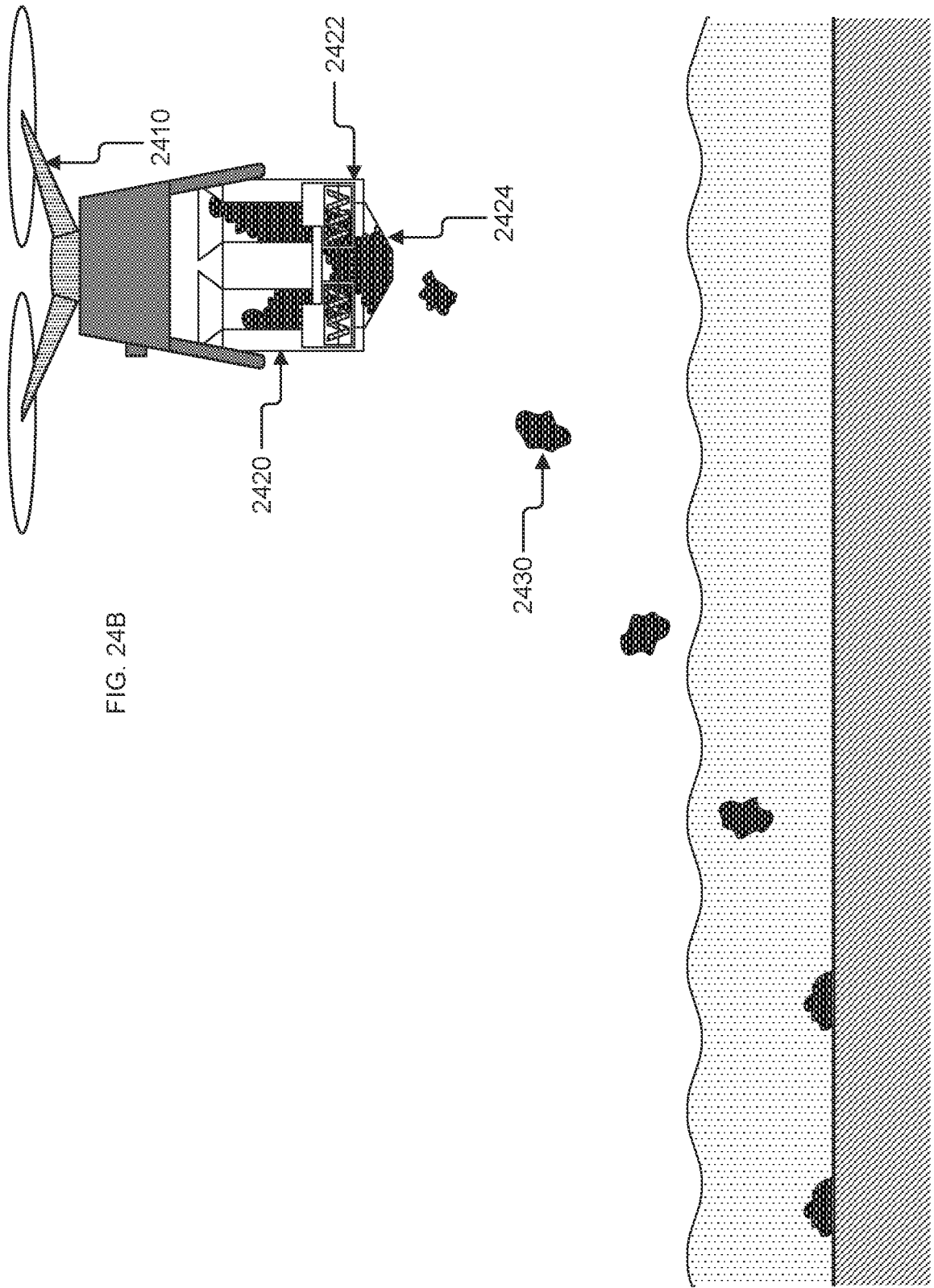
FIG. 24B illustrates an exemplary seedling box delivering seedlings, according to some embodiments of the present disclosure.
Figure 24C:
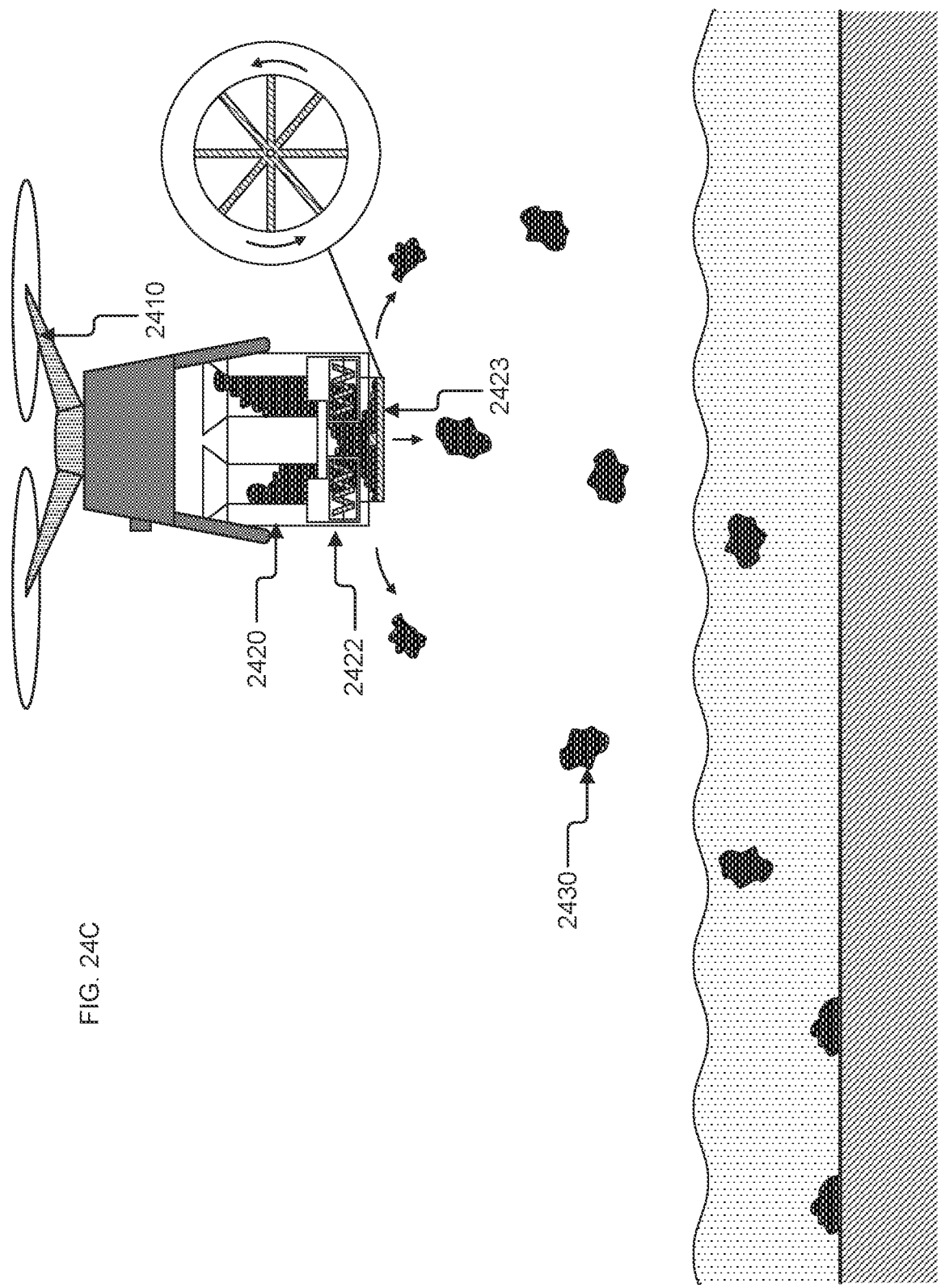
FIG. 24C illustrates an exemplary seedling box delivering seedlings, according to some embodiments of the present disclosure.
Figure 24D:
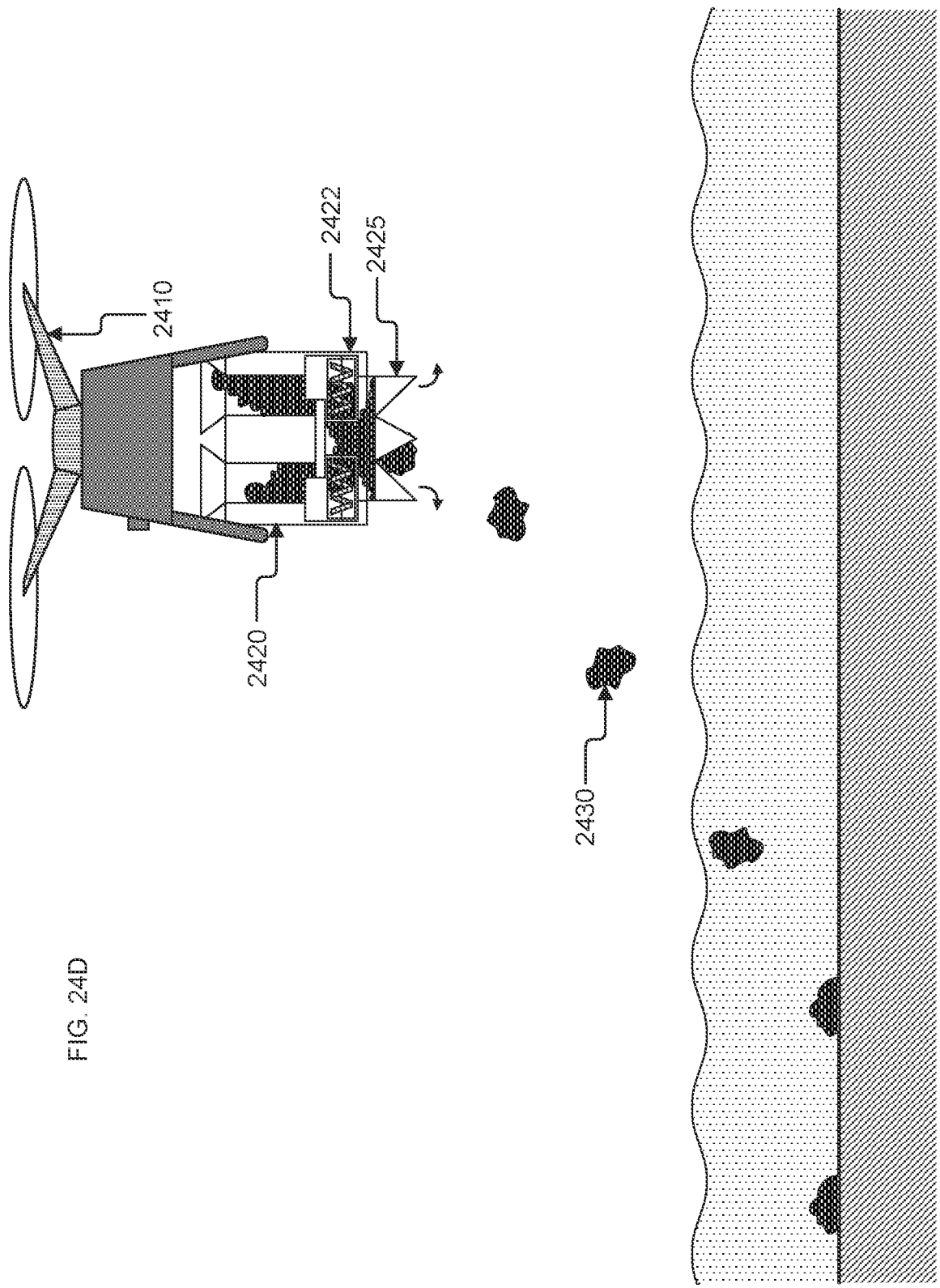
FIG. 24D illustrates an exemplary seedling box delivering seedlings, according to some embodiments of the present disclosure.

Referring now to FIG. 23, an exemplary drone 2310 comprising a seedling box 2320 delivering seedlings 2330 is illustrated. In some embodiments, the seedling box 2320 may comprise a loading mechanism 2323. In some implementations, the seedling box 2320 may comprise a deploying mechanism 2322.

In some aspects, the drone 2310 may allow for the dispersal of seedlings 2330 over parts of land or water that are difficult, dangerous, or impossible for humans to access. In some embodiments, the deploying mechanism 2322 may comprise a timing mechanism to allow for timed release of the seedlings 2330 from the seedling box 2320. In some implementations, the drone 2310 may have to be flown at a predetermined height above the water, so as to not damage the seedlings 2330 during dispersal.

In some embodiments, the seedlings 2330 may comprise a plurality of organisms. As an example, the seedlings may comprise spats of oysters with the intent of interspersing spats of oyster seedlings within the perimeter of an oyster reef. In some implementations, the loading mechanism 2323 may provide sufficient separation to allow the spats of oysters to be sufficiently small to prevent clumping that may create ecological issues as the oysters mature.

Referring now to FIGS. 24A-D, an exemplary drone 2410 comprising a seedling box 2420 delivering seedlings 2430 is illustrated. In some embodiments, the drone 2410 may comprise a loading mechanism 2422. In some implementations, the drone may comprise a deploying mechanism 2423, 2424, 2425. In some aspects, the seedling box 2420 may comprise a seedling container 2415.

In some embodiments, the seedling container 2415 may assist in retaining seedlings 2430 within the seedling box 2420. In some implementations, the seedling container 2415 may extrude from the seedling box 2420, thereby allowing external interaction with the seedling box while the seedling box remains connected to the drone 2410.

As an illustrative example, funnels may extrude from the top of the seedling box 2420 to allow an external user to add additional seedlings 2430 when the drone has released previously stored seedlings 2430. The seedling container 2415 may provide rigidity to small clumps of seedlings 2430, such as spats of oysters, to facilitate a smooth deployment process to the deploying mechanism 2423.

In some embodiments, the deploying mechanism 2423 may deploy a plurality of seedlings 2430 simultaneously. In some implementations, the deploying mechanism 2423 may comprise a surface with a plurality of openings, whereby a plurality of seedlings 2430 may be deployed simultaneously. In some aspects, the deploying mechanism 2423 may rotate to deploy the seedlings 2430.

For example, the deploying mechanism 2423 may comprise a rotational disk with portioned ridges and an inclined center whereby the seedlings 2430, when received from the loading mechanism 2422, may distribute the seedlings 2430 evenly across the portioned ridges and, using centrifugal force, distribute a plurality of seedlings 2430 simultaneously.

In some embodiments, the deploying mechanism 2424, 2425 may comprise one or more openings to deploy seedlings 2430. In some implementations, the deploying mechanism 2424 may comprise a funnel-shape that may collect and focus the seedlings 2430 into a concentrated area. This design may allow for targeted deployment of seedlings 2430 in scenarios where precise placement might be necessary.

In some aspects, the deploying mechanism 2425 may comprise one or more centralized openings. In some embodiments, the deploying mechanism 2425 may operate on a time-keeping mechanism, such as a timer. As an illustrative example, the time-keeping mechanism may allow the deploying mechanism 2425 to release oyster spats in intervals, so as to prevent overpopulation during oyster development in a predetermined region of deployment.

Figure 25A:
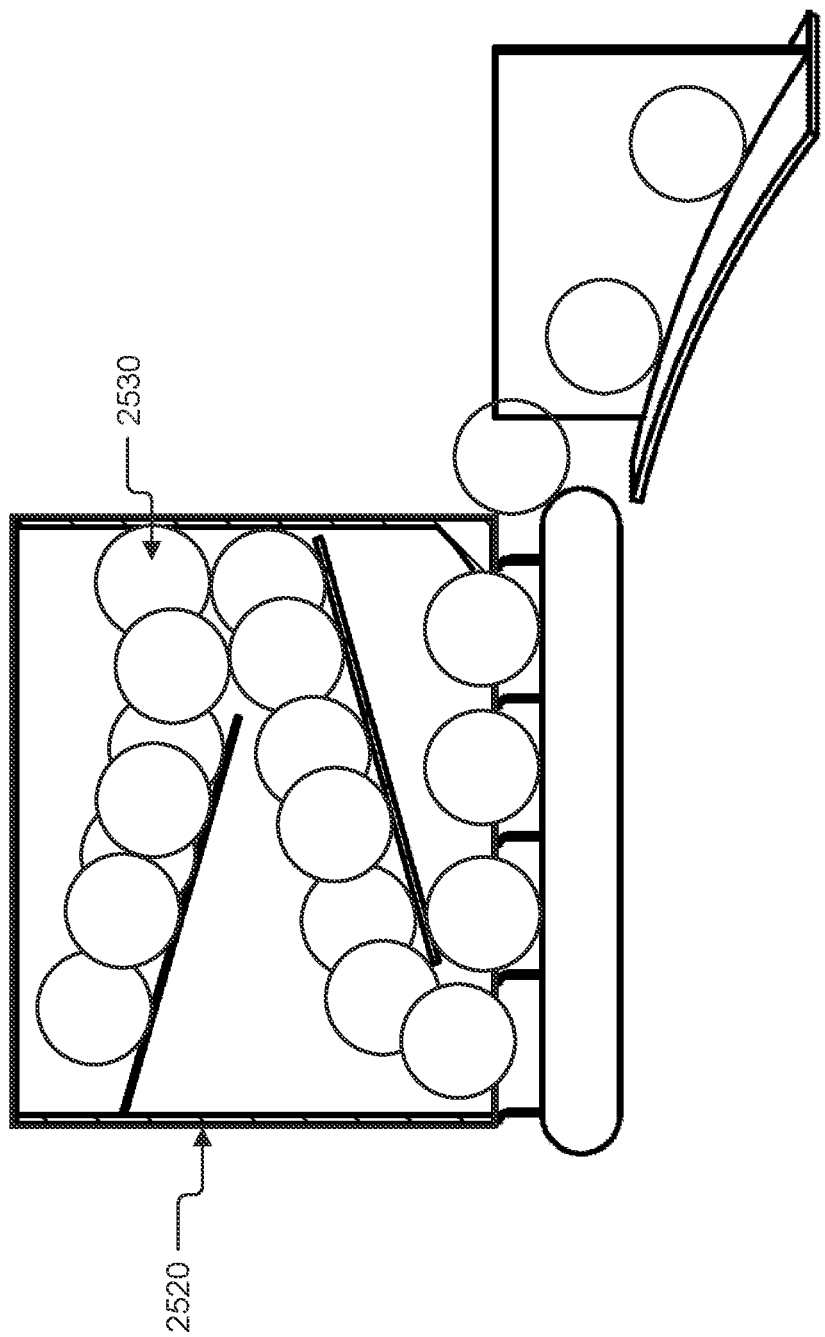
FIG. 25A illustrates an exemplary seedling box delivering seedlings, according to some embodiments of the present disclosure.

Referring now to FIGS. 25A-B, an exemplary drone 2510 comprising a seedling box 2520 delivering seedlings 2530 is illustrated. In some embodiments, the seedling box 2520 may adapt to versatile applications. As an illustrative example, the seedling box 2520 may comprise fire starters that, when deployed, may ignite flammable brush in a forest. Starting fires may assist firefighting efforts where the safety measures for fire containment may comprise the formation of fire lines along the perimeters of a large brush fire to keep the fire from extending beyond the point of the fire lines. The fire lines may comprise areas that have previously been consumed by fire, thereby leaving little flammable material for the growing forest fire to consume for further expansion.

As another example, when interfaced with the drone 2510, the seedling box 2520 may deploy fire retardant when flown over a fire, such as a brush fire, forest fire, controlled burn, or housefire, as non-limiting examples. This compatibility may be especially useful in situations where it is extremely difficult, dangerous, or even impossible to manually extinguish a fire.

In some implementations, the deploying mechanism 2522 may operate on a time-keeping mechanism, such as a timer. As an illustrative example, the time-keeping mechanism may allow the deploying mechanism to release fire retardant in intervals, so as to limit the amount of fire retardant deployed at any given time. For example, this may be useful in extinguishing controlled burns, as some regions of the treatment area may be more densely populated by vegetation than others. As another example, the timed deployment of fire starters may assist in forming a fire line that inhibits the direction and spread of a forest fire.

In some aspects, correct timing of seedling 2530 deployment may provide for consistent application of the seedlings 2530 to the intended environment. This may ensure that the capacity of the seedling box 2520 is not depleted before the targeted deployment area is adequately covered with the seedlings 2530. Referring to the previous fire retardant example, the timed deployment of seedlings 2530 may allow for a constant and even distribution of the seedlings 2530 without interruption or the formation of unintended gaps between seedling 2530 placement.

In some aspects, the time-keeping mechanism may interface with moveable barriers within the bottom of the seedling box 2520. These moveable barriers may engage and disengage when prompted by the time-keeping mechanism, advancing a seedling 2530 from a position further from the deploying mechanism 2522 to a position closer to the deploying mechanism sharing. The moveable barriers may form separate, individual slots that house a seedling 2530 when the moveable barriers are engaged.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A system for aerial drone delivery of aquatic organisms, the system comprising:
    an aerial drone;
        an aquatic organism receptacle, wherein the aquatic organism receptacle comprises two or more container portions, wherein each of the two or more container portions is configured to house aquatic organisms, wherein each of the two or more container portions comprises at least one sidewall that prevents aquatic organisms within different container portions from physically contacting each other, wherein at least one of the two or more container portions comprises at least one aquatic organism, wherein consecutive container portions are laterally adjacent to each other;
    a drone connector mechanism configured to connect the two or more container portions to the aerial drone;
    a loading mechanism configured to move seedlings from a bottom portion of each of the two or more container portions, wherein the loading mechanism comprises two or more helical segments, wherein each of the two or more helical segments is configured below one of the two or more container portions; and
    a deploying mechanism configured to receive seedlings from the loading mechanism and configured to deploy seedlings for planting, wherein the two or more helical segments are oriented to direct aquatic organisms toward a central portion of the deploying mechanism, wherein a bottom portion of the deploying mechanism comprises a plurality of openings configured to release a plurality of aquatic organisms from the deploying mechanism.

2. The system of claim 1, wherein each of the plurality of openings comprises a securing mechanism, wherein the securing mechanism is alterable between an open position and a closed position, wherein aquatic organisms are able to move through each of the plurality of openings when the securing mechanism is in the open position, wherein aquatic organisms are blocked from moving through each of the plurality of openings when the securing mechanism is in the closed position.

3. The system of claim 2, wherein the system further comprises at least one time-keeping mechanism configured to alter the securing mechanism of one or more of the plurality of openings between the open position and the closed position at one or more predetermined time intervals.

4. A system for aerial drone delivery of aquatic organisms, the system comprising:
    an aerial drone;
        an aquatic organism receptacle, wherein the aquatic organism receptacle comprises two or more container portions, wherein each of the two or more container portions is configured to house aquatic organisms, wherein each of the two or more container portions comprises at least one sidewall that prevents aquatic organisms within different container portions from physically contacting each other, wherein at least one of the two or more container portions comprises at least one aquatic organism, wherein consecutive container portions are laterally adjacent to each other;

a drone connector mechanism configured to connect the two or more container portions to the aerial drone;

a loading mechanism configured to move seedlings from a bottom portion of each of the two or more container portions, wherein the loading mechanism comprises two or more helical segments, wherein each of the two or more helical segments is configured below one of the two or more container portions;

a deploying mechanism configured to receive seedlings from the loading mechanism and configured to deploy seedlings for planting, wherein the two or more helical segments are oriented to direct aquatic organisms toward a central portion of the deploying mechanism, wherein the deploying mechanism, further including:

portioned ridges, wherein the deploying mechanism is configured to rotate to generate a centrifugal force to disburse aquatic organisms; and a circular planar member with an inclined center portion, wherein the inclined center portion provides a gradient that directs aquatic organisms toward an outer perimeter of the deploying mechanism.

* * * * *